(12) United States Patent  (10) Patent No.: US 9,383,552 B2
Liao  (45) Date of Patent: Jul. 5, 2016

(54) OPTICAL IMAGING LENS AND ELECTRONIC DEVICE COMPRISING THE SAME

(71) Applicant: Genius Electronic Optical Co., Ltd., Taichung (TW)

(72) Inventor: Chen-Cheng Liao, Taichung (TW)

(73) Assignee: Genius Electronic Optical Co., Ltd., Central Taiwan Science Park, Daya District, Taichung (TW)

( * ) Notice: Subject to any disclaimer, the term of this patent is extended or adjusted under 35 U.S.C. 154(b) by 0 days.

(21) Appl. No.: 14/261,433

(22) Filed: Apr. 25, 2014

(65) Prior Publication Data

US 2015/0116572 A1  Apr. 30, 2015

(30) Foreign Application Priority Data

Oct. 31, 2013 (TW) .............................. 102139575 A

(51) Int. Cl.
| | |
|---|---|
| *G02B 3/02* | (2006.01) |
| *G02B 13/18* | (2006.01) |
| *G02B 9/62* | (2006.01) |
| *G02B 13/00* | (2006.01) |
| *H04N 5/225* | (2006.01) |
| *G02B 3/04* | (2006.01) |
| *G02B 5/00* | (2006.01) |
| *G02B 13/04* | (2006.01) |

(52) U.S. Cl.
CPC .......... *G02B 13/0045* (2013.01); *H04N 5/2254* (2013.01); *G02B 3/04* (2013.01); *G02B 5/005* (2013.01); *G02B 9/62* (2013.01); *G02B 13/002* (2013.01); *G02B 13/0015* (2013.01); *G02B 13/04* (2013.01); *G02B 13/18* (2013.01)

(58) Field of Classification Search
CPC ...... G02B 13/0045; G02B 9/62; G02B 13/18; G02B 13/04; G02B 13/0015; G02B 3/04; G02B 5/005; G02B 13/002
USPC .................. 359/713, 740, 749, 752, 756, 761
See application file for complete search history.

(56) References Cited

U.S. PATENT DOCUMENTS

| | | |
|---|---|---|
| 6,994,668 B2 | 2/2006 | Miyano |
| 6,995,925 B2 | 2/2006 | Noda |
| 7,085,068 B2 | 8/2006 | Noda |
| 7,580,205 B2 | 8/2009 | Asami |
| 7,595,938 B2 | 9/2009 | Yamakawa |
| 7,663,814 B2 | 2/2010 | Kitahara |
| 7,907,352 B2 | 3/2011 | Miyano |
| 7,957,074 B2 | 6/2011 | Asami |

(Continued)

FOREIGN PATENT DOCUMENTS

| | | |
|---|---|---|
| CN | 201955535 U | 8/2011 |
| CN | 202693897 U | 1/2013 |
| TW | 201038968 A1 | 11/2010 |
| TW | 201227045 A1 | 7/2012 |

(Continued)

*Primary Examiner* — Evelyn A Lester

(74) *Attorney, Agent, or Firm* — Winston Hsu; Scott Margo

(57) ABSTRACT

An optical imaging lens set includes a first lens element to a sixth lens element from an object side toward an image side along an optical axis. The first lens element has negative refractive power. The second lens element has an object-side surface with a convex portion in a vicinity of periphery. The third lens element has an object-side surface with a convex portion in a vicinity of periphery. The fifth lens element has an image-side surface with a convex portion in a vicinity of the optical axis. The sixth lens element has an object-side surface with a concave portion in a vicinity of its periphery.

17 Claims, 28 Drawing Sheets

(56) References Cited

U.S. PATENT DOCUMENTS

| | | |
|---|---|---|
| 7,995,291 B2 | 8/2011 | Yamamoto |
| 8,054,562 B2 | 11/2011 | Asami |
| 2010/0305405 A1 | 12/2010 | Miyano |
| 2014/0118844 A1* | 5/2014 | Tsai et al. .................... 359/713 |

FOREIGN PATENT DOCUMENTS

| | | |
|---|---|---|
| TW | 201235731 A1 | 9/2012 |
| TW | 201245757 A1 | 11/2012 |
| TW | 201300872 A1 | 1/2013 |
| TW | 201303412 A1 | 1/2013 |

* cited by examiner

| First Example | | | | | | |
|---|---|---|---|---|---|---|
| F= 1.456 mm, HFOV= 53.674 deg., Fno= 2.612 | | | | | | |
| No. | | Curvature Radius | Ape. Stop Distance Lens Thickness Air Gap | Refractive Index | Abbe No. | Focal Length | Material |
| | Object | Infinity | Infinity | | | | |
| 11 | First Lens | 30.031 | 0.700 T1 | 1.729 | 54.680 | -4.253 | glass |
| 12 | | 2.792 | 1.556 G12 | | | | |
| 21 | Second Lens | 29.113 | 2.135 T2 | 1.637 | 23.231 | 650.344 | plastic |
| 22 | | 30.396 | 0.660 G23 | | | | |
| 31 | Third Lens | 4.087 | 2.122 T3 | 1.532 | 56.064 | 6.076 | plastic |
| 32 | | -12.910 | 0.316 G34 | | | | |
| 80 | Ape. Stop | Infinity | 0.318 | | | | |
| 41 | Fourth Lens | 4.132 | 0.339 T4 | 1.637 | 23.231 | -5.940 | plastic |
| 42 | | 1.920 | 0.060 G45 | | | | |
| 51 | Fifth Lens | 3.031 | 1.939 T5 | 1.545 | 55.930 | 1.468 | plastic |
| 52 | | -0.845 | 0.030 G56 | | | | |
| 61 | Sixth Lens | 1.399 | 0.300 T6 | 1.637 | 23.231 | -2.538 | plastic |
| 62 | | 0.690 | 0.500 | | | | |
| 60 | IR Filter | Infinity | 0.210 | | | | |
| | | Infinity | 1.120 | | | | |
| | | Infinity | 0 | | | | |
| 71 | Image Plane | Infinity | | | | | |

FIG. 20

| No. | 11 | 12 | 21 | 22 | 31 | 32 |
|---|---|---|---|---|---|---|
| K | 0.000E+00 | 0.000E+00 | 5.359E+01 | -1.998E+04 | 6.087E-01 | 4.761E-01 |
| a4 | 0.000E+00 | 0.000E+00 | 4.523E-03 | -5.287E-03 | -6.892E-03 | -7.034E-03 |
| a6 | 0.000E+00 | 0.000E+00 | -3.773E-04 | 2.511E-04 | 4.151E-03 | 3.920E-02 |
| a8 | 0.000E+00 | 0.000E+00 | -6.179E-06 | 1.735E-04 | 1.261E-03 | -9.601E-03 |
| a10 | 0.000E+00 | 0.000E+00 | 0.000E+00 | 0.000E+00 | 0.000E+00 | 0.000E+00 |
| a12 | 0.000E+00 | 0.000E+00 | 0.000E+00 | 0.000E+00 | 0.000E+00 | 0.000E+00 |
| a14 | 0.000E+00 | 0.000E+00 | 0.000E+00 | 0.000E+00 | 0.000E+00 | 0.000E+00 |
| a16 | 0.000E+00 | 0.000E+00 | 0.000E+00 | 0.000E+00 | 0.000E+00 | 0.000E+00 |
| a18 | 0.000E+00 | 0.000E+00 | 0.000E+00 | 0.000E+00 | 0.000E+00 | 0.000E+00 |
| No. | 41 | 42 | 51 | 52 | 61 | 62 |
| K | 3.047E+01 | -1.939E+01 | 4.845E+00 | -2.786E+00 | -1.507E+01 | -4.634E+00 |
| a4 | -3.916E-01 | -7.469E-02 | -2.243E-02 | 2.672E-03 | -1.064E-01 | -1.724E-01 |
| a6 | -7.381E-03 | -2.449E-01 | -2.654E-02 | -9.590E-02 | -3.467E-02 | 9.014E-02 |
| a8 | -1.602E-01 | 2.425E-01 | 9.034E-02 | 1.161E-01 | 6.188E-02 | -2.787E-02 |
| a10 | 0.000E+00 | 0.000E+00 | -4.951E-02 | -1.531E-02 | -3.046E-02 | 3.621E-03 |
| a12 | 0.000E+00 | 0.000E+00 | 0.000E+00 | -2.806E-02 | 5.947E-03 | 8.024E-05 |
| a14 | 0.000E+00 | 0.000E+00 | 0.000E+00 | 1.308E-02 | -6.404E-04 | -7.716E-05 |
| a16 | 0.000E+00 | 0.000E+00 | 0.000E+00 | 0.000E+00 | 0.000E+00 | 0.000E+00 |
| a18 | 0.000E+00 | 0.000E+00 | 0.000E+00 | 0.000E+00 | 0.000E+00 | 0.000E+00 |

FIG. 21

| Second Example | | | | | | |
|---|---|---|---|---|---|---|
| F= 1.455mm, HFOV=51.061 deg., Fno= 2.606 | | | | | | |
| No. | | Curvature Radius | Ape. Stop Distance Lens Thickness Air Gap | Refractive Index | Abbe No. | Focal Length | Material |
| | Object | Infinity | Infinity | | | | |
| 11 | First Lens | 26.261 | 0.600 T1 | 1.729 | 54.680 | -5.270 | glass |
| 12 | | 3.330 | 2.008 G12 | | | | |
| 21 | Second Lens | 13.481 | 1.502 T2 | 1.637 | 23.231 | -19.372 | plastic |
| 22 | | 6.189 | 2.292 G23 | | | | |
| 31 | Third Lens | 2.577 | 1.870 T3 | 1.545 | 55.930 | 4.055 | plastic |
| 32 | | -11.800 | 0.515 G34 | | | | |
| 80 | Ape. Stop | Infinity | 0.393 | | | | |
| 41 | Fourth Lens | 4.394 | 0.388 T4 | 1.643 | 22.437 | -4.940 | plastic |
| 42 | | 1.788 | 0.060 G45 | | | | |
| 51 | Fifth Lens | 3.178 | 1.258 T5 | 1.545 | 55.930 | 1.395 | plastic |
| 52 | | -0.863 | 0.020 G56 | | | | |
| 61 | Sixth Lens | 1.485 | 0.300 T6 | 1.643 | 22.437 | -2.308 | plastic |
| 62 | | 0.686 | 0.500 | | | | |
| 60 | IR Filter | Infinity | 0.210 | | | | |
| | | Infinity | 0.889 | | | | |
| | | Infinity | 0.000 | | | | |
| 71 | Image Plane | Infinity | | | | | |

FIG. 22

| No. | 11 | 12 | 21 | 22 | 31 | 32 |
|---|---|---|---|---|---|---|
| K | 0.000E+00 | 0.000E+00 | -3.836E+01 | -1.970E+01 | -4.784E-01 | 1.092E+02 |
| a4 | 0.000E+00 | 0.000E+00 | 2.513E-03 | -4.845E-03 | -1.225E-02 | -1.058E-02 |
| a6 | 0.000E+00 | 0.000E+00 | -2.667E-04 | 1.602E-04 | -6.246E-05 | 4.953E-02 |
| a8 | 0.000E+00 | 0.000E+00 | 2.211E-05 | 2.321E-05 | 1.359E-03 | -5.253E-02 |
| a10 | 0.000E+00 | 0.000E+00 | 0.000E+00 | 0.000E+00 | -1.904E-04 | 2.606E-02 |
| a12 | 0.000E+00 | 0.000E+00 | 0.000E+00 | 0.000E+00 | 0.000E+00 | 0.000E+00 |
| a14 | 0.000E+00 | 0.000E+00 | 0.000E+00 | 0.000E+00 | 0.000E+00 | 0.000E+00 |
| a16 | 0.000E+00 | 0.000E+00 | 0.000E+00 | 0.000E+00 | 0.000E+00 | 0.000E+00 |
| a18 | 0.000E+00 | 0.000E+00 | 0.000E+00 | 0.000E+00 | 0.000E+00 | 0.000E+00 |
| No. | 41 | 42 | 51 | 52 | 61 | 62 |
| K | 3.132E+01 | -1.871E+01 | 5.092E+00 | -2.856E+00 | -1.629E+01 | -4.560E+00 |
| a4 | -3.658E-01 | -6.386E-02 | -2.347E-02 | 1.490E-02 | -1.697E-01 | -1.744E-01 |
| a6 | 8.458E-02 | -2.248E-01 | -2.672E-02 | -8.990E-02 | -4.869E-02 | 8.181E-02 |
| a8 | -2.501E-01 | 1.506E-01 | 9.712E-02 | 1.370E-01 | 6.141E-02 | -2.922E-02 |
| a10 | 0.000E+00 | 0.000E+00 | -4.367E-02 | -2.076E-03 | -2.860E-02 | 4.686E-03 |
| a12 | 0.000E+00 | 0.000E+00 | 0.000E+00 | -2.351E-02 | 5.518E-03 | 2.550E-04 |
| a14 | 0.000E+00 | 0.000E+00 | 0.000E+00 | 1.181E-02 | -2.919E-03 | -2.009E-04 |
| a16 | 0.000E+00 | 0.000E+00 | 0.000E+00 | 0.000E+00 | 0.000E+00 | 0.000E+00 |
| a18 | 0.000E+00 | 0.000E+00 | 0.000E+00 | 0.000E+00 | 0.000E+00 | 0.000E+00 |

FIG. 23

| Third Example | | | | | | |
|---|---|---|---|---|---|---|
| F= 1.417 mm, HFOV=49.693 deg., Fno= 2.635 | | | | | | |
| No. | | Curvature Radius | Ape. Stop Distance Lens Thickness Air Gap | Refractive Index | Abbe No. | Focal Length | Material |
| | Object | Infinity | Infinity | | | | |
| 11 | First Lens | 19.806 | 0.500 T1 | 1.729 | 54.680 | -5.047 | glass |
| 12 | | 3.079 | 2.141 G12 | | | | |
| 21 | Second Lens | 12.291 | 0.519 T2 | 1.585 | 29.909 | -51.372 | plastic |
| 22 | | 8.604 | 2.307 G23 | | | | |
| 31 | Third Lens | 2.562 | 0.905 T3 | 1.545 | 55.930 | 4.058 | plastic |
| 32 | | -14.488 | 0.415 G34 | | | | |
| 80 | Ape. Stop | Infinity | 0.470 | | | | |
| 41 | Fourth Lens | 4.474 | 0.299 T4 | 1.643 | 22.437 | -4.697 | plastic |
| 42 | | 1.764 | 0.060 G45 | | | | |
| 51 | Fifth Lens | 3.136 | 1.159 T5 | 1.545 | 55.930 | 1.338 | plastic |
| 52 | | -0.829 | 0.067 G56 | | | | |
| 61 | Sixth Lens | 1.374 | 0.288 T6 | 1.643 | 22.437 | -2.124 | plastic |
| 62 | | 0.631 | 0.500 | | | | |
| 60 | IR Filter | Infinity | 0.210 | | | | |
| | | Infinity | 0.790 | | | | |
| | | Infinity | 0.000 | | | | |
| 71 | Image Plane | Infinity | | | | | |

FIG. 24

| No. | 11 | 12 | 21 | 22 | 31 | 32 |
|---|---|---|---|---|---|---|
| K | 0.000E+00 | 0.000E+00 | -6.971E+00 | -1.996E+01 | -9.503E-01 | 1.366E+02 |
| a4 | 0.000E+00 | 0.000E+00 | 2.688E-03 | -5.285E-03 | -1.628E-02 | -2.329E-02 |
| a6 | 0.000E+00 | 0.000E+00 | -3.631E-04 | 7.881E-05 | 2.211E-03 | 6.564E-02 |
| a8 | 0.000E+00 | 0.000E+00 | 1.027E-05 | 1.215E-05 | 3.463E-03 | -4.562E-02 |
| a10 | 0.000E+00 | 0.000E+00 | 0.000E+00 | 0.000E+00 | 6.057E-04 | 1.571E-02 |
| a12 | 0.000E+00 | 0.000E+00 | 0.000E+00 | 0.000E+00 | 0.000E+00 | 0.000E+00 |
| a14 | 0.000E+00 | 0.000E+00 | 0.000E+00 | 0.000E+00 | 0.000E+00 | 0.000E+00 |
| a16 | 0.000E+00 | 0.000E+00 | 0.000E+00 | 0.000E+00 | 0.000E+00 | 0.000E+00 |
| a18 | 0.000E+00 | 0.000E+00 | 0.000E+00 | 0.000E+00 | 0.000E+00 | 0.000E+00 |
| No. | 41 | 42 | 51 | 52 | 61 | 62 |
| K | 3.194E-01 | -1.795E+01 | 5.173E+00 | -2.544E+00 | -1.575E+01 | -4.217E+00 |
| a4 | -3.936E-01 | -5.018E-02 | -2.006E-02 | 1.773E-02 | -1.737E-01 | -1.783E-01 |
| a6 | 9.337E-02 | -2.187E-01 | -2.452E-02 | -9.673E-02 | -3.863E-02 | 8.700E-02 |
| a8 | -7.441E-02 | 2.115E-01 | 9.681E-02 | 1.280E-01 | 6.140E-02 | -3.009E-02 |
| a10 | -5.515E-03 | -4.052E-03 | -4.462E-02 | -6.506E-03 | -3.082E-02 | 4.097E-03 |
| a12 | 0.000E+00 | 0.000E+00 | -7.353E-04 | -2.348E-02 | 3.870E-03 | 1.622E-04 |
| a14 | 0.000E+00 | 0.000E+00 | 0.000E+00 | 1.424E-02 | -3.353E-03 | -1.326E-04 |
| a16 | 0.000E+00 | 0.000E+00 | 0.000E+00 | 0.000E+00 | 0.000E+00 | 0.000E+00 |
| a18 | 0.000E+00 | 0.000E+00 | 0.000E+00 | 0.000E+00 | 0.000E+00 | 0.000E+00 |

FIG. 25

| Fourth Example ||||||||
|---|---|---|---|---|---|---|---|
| F= 1.457mm, HFOV=54.366 deg., Fno= 2.613 ||||||||
| No. | | Curvature Radius | Ape. Stop Distance Lens Thickness Air Gap | Refractive Index | Abbe No. | Focal Length | Material |
| | Object | Infinity | Infinity | | | | |
| 11 | First Lens | 25.775 | 0.700 T1 | 1.729 | 54.680 | -4.304 | glass |
| 12 | | 2.774 | 1.431 G12 | | | | |
| 21 | Second Lens | 24.676 | 2.005 T2 | 1.637 | 23.231 | 148.247 | plastic |
| 22 | | 32.248 | 0.660 G23 | | | | |
| 31 | Third Lens | 4.025 | 2.270 T3 | 1.532 | 56.064 | 6.004 | plastic |
| 32 | | -12.672 | 0.120 G34 | | | | |
| 80 | Ape. Stop | Infinity | 0.221 | | | | |
| 41 | Fourth Lens | 4.098 | 0.332 T4 | 1.637 | 23.231 | -6.065 | plastic |
| 42 | | 1.934 | 0.060 G45 | | | | |
| 51 | Fifth Lens | 3.029 | 1.907 T5 | 1.545 | 55.930 | 1.462 | plastic |
| 52 | | -0.844 | 0.030 G56 | | | | |
| 61 | Sixth Lens | 1.367 | 0.300 T6 | 1.637 | 23.231 | -2.587 | plastic |
| 62 | | 0.686 | 0.500 | | | | |
| 60 | IR Filter | Infinity | 0.210 | | | | |
| | | Infinity | 1.039 | | | | |
| | | Infinity | 0.000 | | | | |
| 71 | Image Plane | Infinity | | | | | |

FIG. 26

| No. | 11 | 12 | 21 | 22 | 31 | 32 |
|---|---|---|---|---|---|---|
| K | 0.000E+00 | 0.000E+00 | 5.903E+01 | -3.495E+04 | 7.205E-01 | 7.535E+01 |
| a4 | 0.000E+00 | 0.000E+00 | 4.455E-03 | -5.249E-03 | -6.770E-03 | -1.161E-02 |
| a6 | 0.000E+00 | 0.000E+00 | -3.926E-04 | 1.827E-04 | 4.474E-03 | 4.584E-02 |
| a8 | 0.000E+00 | 0.000E+00 | -6.116E-06 | 1.560E-04 | 1.305E-03 | 1.492E-02 |
| a10 | 0.000E+00 | 0.000E+00 | 0.000E+00 | 0.000E+00 | 0.000E+00 | 0.000E+00 |
| a12 | 0.000E+00 | 0.000E+00 | 0.000E+00 | 0.000E+00 | 0.000E+00 | 0.000E+00 |
| a14 | 0.000E+00 | 0.000E+00 | 0.000E+00 | 0.000E+00 | 0.000E+00 | 0.000E+00 |
| a16 | 0.000E+00 | 0.000E+00 | 0.000E+00 | 0.000E+00 | 0.000E+00 | 0.000E+00 |
| a18 | 0.000E+00 | 0.000E+00 | 0.000E+00 | 0.000E+00 | 0.000E+00 | 0.000E+00 |
| No. | 41 | 42 | 51 | 52 | 61 | 62 |
| K | 3.107E+01 | -1.968E+01 | 4.741E+00 | -2.687E+00 | -1.503E+01 | -4.627E+00 |
| a4 | -3.951E-01 | -7.287E-02 | -2.381E-02 | -2.057E-04 | -1.103E-01 | -1.667E-01 |
| a6 | -1.202E-02 | -2.406E-01 | -2.791E-02 | -9.695E-02 | -3.488E-02 | 8.854E-02 |
| a8 | -1.609E-01 | 2.292E-01 | 9.096E-02 | 1.158E-01 | 6.149E-02 | -2.823E-02 |
| a10 | 0.000E+00 | 0.000E+00 | -4.893E-02 | -1.516E-02 | -3.081E-02 | 3.578E-03 |
| a12 | 0.000E+00 | 0.000E+00 | 0.000E+00 | -2.772E-02 | 5.876E-03 | 8.483E-05 |
| a14 | 0.000E+00 | 0.000E+00 | 0.000E+00 | 1.347E-02 | -5.812E-04 | -7.015E-05 |
| a16 | 0.000E+00 | 0.000E+00 | 0.000E+00 | 0.000E+00 | 0.000E+00 | 0.000E+00 |
| a18 | 0.000E+00 | 0.000E+00 | 0.000E+00 | 0.000E+00 | 0.000E+00 | 0.000E+00 |

FIG. 27

| Fifth Example ||||||||
|---|---|---|---|---|---|---|---|
| F= 1.454mm, HFOV=53.5 deg., Fno= 2.618 ||||||||
| No. | | Curvature Radius | Ape. Stop Distance Lens Thickness Air Gap | Refractive Index | Abbe No. | Focal Length | Material |
| | Object | Infinity | Infinity | | | | |
| 11 | First Lens | 22.837 | 0.700 T1 | 1.729 | 54.680 | -4.261 | glass |
| 12 | | 2.700 | 1.702 G12 | | | | |
| 21 | Second Lens | 20.120 | 1.345 T2 | 1.637 | 23.231 | 83.362 | plastic |
| 22 | | 31.537 | 0.680 G23 | | | | |
| 31 | Third Lens | 4.034 | 2.192 T3 | 1.532 | 56.064 | 6.015 | plastic |
| 32 | | -12.599 | 0.141 G34 | | | | |
| 80 | Ape. Stop | Infinity | 0.260 | | | | |
| 41 | Fourth Lens | 4.090 | 0.329 T4 | 1.637 | 23.231 | -6.120 | plastic |
| 42 | | 1.934 | 0.060 G45 | | | | |
| 51 | Fifth Lens | 3.019 | 1.806 T5 | 1.545 | 55.930 | 1.445 | plastic |
| 52 | | -0.841 | 0.030 G56 | | | | |
| 61 | Sixth Lens | 1.355 | 0.300 T6 | 1.637 | 23.231 | -2.616 | plastic |
| 62 | | 0.683 | 0.500 | | | | |
| 60 | IR Filter | Infinity | 0.210 | | | | |
| | | Infinity | 1.002 | | | | |
| | | Infinity | 0.000 | | | | |
| 71 | Image Plane | Infinity | | | | | |

FIG. 28

| No. | 11 | 12 | 21 | 22 | 31 | 32 |
|---|---|---|---|---|---|---|
| K | 0.000E+00 | 0.000E+00 | 4.031E+01 | -4.204E+04 | 2.666E-01 | 7.612E+01 |
| a4 | 0.000E+00 | 0.000E+00 | 4.874E-03 | -4.998E-03 | -8.269E-03 | -1.106E-02 |
| a6 | 0.000E+00 | 0.000E+00 | -4.695E-04 | 1.528E-04 | 4.684E-03 | 4.681E-02 |
| a8 | 0.000E+00 | 0.000E+00 | -1.219E-05 | 1.462E-04 | 1.345E-03 | 2.773E-03 |
| a10 | 0.000E+00 | 0.000E+00 | 0.000E+00 | 0.000E+00 | 0.000E+00 | 0.000E+00 |
| a12 | 0.000E+00 | 0.000E+00 | 0.000E+00 | 0.000E+00 | 0.000E+00 | 0.000E+00 |
| a14 | 0.000E+00 | 0.000E+00 | 0.000E+00 | 0.000E+00 | 0.000E+00 | 0.000E+00 |
| a16 | 0.000E+00 | 0.000E+00 | 0.000E+00 | 0.000E+00 | 0.000E+00 | 0.000E+00 |
| a18 | 0.000E+00 | 0.000E+00 | 0.000E+00 | 0.000E+00 | 0.000E+00 | 0.000E+00 |
| No. | 41 | 42 | 51 | 52 | 61 | 62 |
| K | 3.128E+01 | -1.970E+01 | 4.836E+00 | -2.610E+00 | -1.574E+01 | -4.713E+00 |
| a4 | -3.957E-01 | -7.324E-02 | -2.544E-02 | -1.486E-03 | -1.146E-01 | -1.655E-01 |
| a6 | -1.381E-02 | -2.414E-01 | -2.973E-02 | -9.779E-02 | -3.769E-02 | 8.777E-02 |
| a8 | -1.866E-01 | 2.284E-01 | 9.067E-02 | 1.151E-01 | 6.065E-02 | -2.859E-02 |
| a10 | 0.000E+00 | 0.000E+00 | -4.783E-02 | -1.540E-02 | -3.166E-02 | 3.600E-03 |
| a12 | 0.000E+00 | 0.000E+00 | 0.000E+00 | -2.761E-02 | 5.298E-03 | 1.064E-04 |
| a14 | 0.000E+00 | 0.000E+00 | 0.000E+00 | 1.377E-02 | -7.478E-04 | -6.085E-05 |
| a16 | 0.000E+00 | 0.000E+00 | 0.000E+00 | 0.000E+00 | 0.000E+00 | 0.000E+00 |
| a18 | 0.000E+00 | 0.000E+00 | 0.000E+00 | 0.000E+00 | 0.000E+00 | 0.000E+00 |

FIG. 29

| Sixth Example ||||||||
|---|---|---|---|---|---|---|---|
| F= 1.445mm, HFOV=51.169 deg., Fno= 2.627 ||||||||
| No. | | Curvature Radius | Ape. Stop Distance Lens Thickness Air Gap | Refractive Index | Abbe No. | Focal Length | Material |
| | Object | Infinity | Infinity | | | | |
| 11 | First Lens | 23.188 | 0.500 T1 | 1.729 | 54.680 | -4.837 | glass |
| 12 | | 3.034 | 2.009 G12 | | | | |
| 21 | Second Lens | 10.572 | 0.575 T2 | 1.585 | 29.909 | -66.573 | plastic |
| 22 | | 8.149 | 2.240 G23 | | | | |
| 31 | Third Lens | 2.538 | 1.300 T3 | 1.545 | 55.930 | 4.096 | plastic |
| 32 | | -15.187 | 0.370 G34 | | | | |
| 80 | Ape. Stop | Infinity | 0.426 | | | | |
| 41 | Fourth Lens | 4.422 | 0.298 T4 | 1.643 | 22.437 | -4.751 | plastic |
| 42 | | 1.759 | 0.060 G45 | | | | |
| 51 | Fifth Lens | 3.139 | 1.169 T5 | 1.545 | 55.930 | 1.343 | plastic |
| 52 | | -0.829 | 0.068 G56 | | | | |
| 61 | Sixth Lens | 1.375 | 0.288 T6 | 1.643 | 22.437 | -2.141 | plastic |
| 62 | | 0.632 | 0.500 | | | | |
| 60 | IR Filter | Infinity | 0.210 | | | | |
| | | Infinity | 0.790 | | | | |
| | | Infinity | 0.000 | | | | |
| 71 | Image Plane | Infinity | | | | | |

FIG. 30

| No. | 11 | 12 | 21 | 22 | 31 | 32 |
|---|---|---|---|---|---|---|
| K | 0.000E+00 | 0.000E+00 | -4.538E+00 | -2.566E+01 | -9.124E-01 | 1.303E+02 |
| a4 | 0.000E+00 | 0.000E+00 | 2.846E-03 | -5.590E-03 | -1.597E-02 | -2.251E-02 |
| a6 | 0.000E+00 | 0.000E+00 | -3.404E-04 | 6.732E-05 | 1.948E-03 | 6.534E-02 |
| a8 | 0.000E+00 | 0.000E+00 | 8.947E-06 | 1.809E-05 | 2.922E-03 | -4.520E-02 |
| a10 | 0.000E+00 | 0.000E+00 | 0.000E+00 | 0.000E+00 | 1.318E-04 | 1.712E-02 |
| a12 | 0.000E+00 | 0.000E+00 | 0.000E+00 | 0.000E+00 | 0.000E+00 | 0.000E+00 |
| a14 | 0.000E+00 | 0.000E+00 | 0.000E+00 | 0.000E+00 | 0.000E+00 | 0.000E+00 |
| a16 | 0.000E+00 | 0.000E+00 | 0.000E+00 | 0.000E+00 | 0.000E+00 | 0.000E+00 |
| a18 | 0.000E+00 | 0.000E+00 | 0.000E+00 | 0.000E+00 | 0.000E+00 | 0.000E+00 |
| No. | 41 | 42 | 51 | 52 | 61 | 62 |
| K | 3.333E+01 | -1.799E+01 | 5.149E+00 | -2.561E+00 | -1.612E+01 | -4.294E+00 |
| a4 | -3.927E-01 | -5.031E-02 | -2.026E-02 | 1.582E-02 | -1.748E-01 | -1.768E-01 |
| a6 | 8.987E-02 | -2.173E-01 | -2.491E-02 | -9.727E-02 | -3.793E-02 | 8.592E-02 |
| a8 | -9.397E-02 | 2.142E-01 | 9.671E-02 | 1.284E-01 | 6.228E-02 | -3.047E-02 |
| a10 | -3.490E-02 | -3.719E-03 | -4.457E-02 | -6.050E-03 | -2.993E-02 | 4.111E-03 |
| a12 | 0.000E+00 | 0.000E+00 | -7.474E-04 | -2.333E-02 | 4.401E-03 | 1.738E-04 |
| a14 | 0.000E+00 | 0.000E+00 | 0.000E+00 | 1.411E-02 | -3.127E-03 | -1.555E-04 |
| a16 | 0.000E+00 | 0.000E+00 | 0.000E+00 | 0.000E+00 | 0.000E+00 | 0.000E+00 |
| a18 | 0.000E+00 | 0.000E+00 | 0.000E+00 | 0.000E+00 | 0.000E+00 | 0.000E+00 |

FIG. 31

| Seventh Example | | | | | | |
|---|---|---|---|---|---|---|
| F= 1.45mm, HFOV=56.631 deg., Fno= 2.622 | | | | | | |
| No. | | Curvature Radius | Ape. Stop Distance Lens Thickness Air Gap | Refractive Index | Abbe No. | Focal Length | Material |
| | Object | Infinity | Infinity | | | | |
| 11 | First Lens | 56.935 | 0.500 T1 | 1.729 | 54.680 | -4.522 | glass |
| 12 | | 3.105 | 2.071 G12 | | | | |
| 21 | Second Lens | 8.453 | 0.658 T2 | 1.585 | 29.909 | 75.862 | plastic |
| 22 | | 10.140 | 2.272 G23 | | | | |
| 31 | Third Lens | 2.548 | 1.116 T3 | 1.545 | 55.930 | 4.077 | plastic |
| 32 | | -14.652 | 0.382 G34 | | | | |
| 80 | Ape. Stop | Infinity | 0.375 | | | | |
| 41 | Fourth Lens | 4.458 | 0.320 T4 | 1.643 | 22.437 | -4.805 | plastic |
| 42 | | 1.773 | 0.060 G45 | | | | |
| 51 | Fifth Lens | 3.245 | 1.241 T5 | 1.545 | 55.930 | 1.366 | plastic |
| 52 | | -0.836 | 0.062 G56 | | | | |
| 61 | Sixth Lens | 1.388 | 0.290 T6 | 1.643 | 22.437 | -2.123 | plastic |
| 62 | | 0.632 | 0.500 | | | | |
| 60 | IR Filter | Infinity | 0.210 | | | | |
| | | Infinity | 0.743 | | | | |
| | | Infinity | 0.000 | | | | |
| 71 | Image Plane | Infinity | | | | | |

FIG. 32

| No. | 11 | 12 | 21 | 22 | 31 | 32 |
|---|---|---|---|---|---|---|
| K | 0.000E+00 | 0.000E+00 | -2.193E+00 | -2.746E+01 | -8.605E-01 | 1.884E+02 |
| a4 | 0.000E+00 | 0.000E+00 | 2.937E-03 | -5.103E-03 | -1.524E-02 | -2.470E-02 |
| a6 | 0.000E+00 | 0.000E+00 | -3.722E-04 | 7.168E-05 | 1.445E-03 | 5.377E-02 |
| a8 | 0.000E+00 | 0.000E+00 | 2.247E-05 | 5.276E-06 | 6.800E-04 | -4.938E-02 |
| a10 | 0.000E+00 | 0.000E+00 | 0.000E+00 | 0.000E+00 | 2.336E-04 | 2.585E-02 |
| a12 | 0.000E+00 | 0.000E+00 | 0.000E+00 | 0.000E+00 | 0.000E+00 | 0.000E+00 |
| a14 | 0.000E+00 | 0.000E+00 | 0.000E+00 | 0.000E+00 | 0.000E+00 | 0.000E+00 |
| a16 | 0.000E+00 | 0.000E+00 | 0.000E+00 | 0.000E+00 | 0.000E+00 | 0.000E+00 |
| a18 | 0.000E+00 | 0.000E+00 | 0.000E+00 | 0.000E+00 | 0.000E+00 | 0.000E+00 |
| No. | 41 | 42 | 51 | 52 | 61 | 62 |
| K | 3.399E+01 | -1.627E+01 | 5.722E+00 | -2.742E+00 | -1.474E-01 | -4.147E+00 |
| a4 | -3.831E-01 | -6.169E-02 | -1.813E-02 | 1.078E-02 | -1.716E-01 | -1.779E-01 |
| a6 | 6.706E-02 | -2.183E-01 | -1.806E-02 | -1.098E-01 | -4.783E-02 | 8.192E-02 |
| a8 | -1.051E-01 | 2.583E-01 | 9.657E-02 | 1.280E-01 | 4.793E-02 | -2.848E-02 |
| a10 | -2.388E-01 | -9.032E-02 | -4.444E-02 | -8.786E-04 | -2.141E-02 | 4.185E-03 |
| a12 | 0.000E+00 | 0.000E+00 | -4.748E-03 | -2.019E-02 | 8.799E-03 | 5.557E-04 |
| a14 | 0.000E+00 | 0.000E+00 | 0.000E+00 | 1.261E-02 | -6.527E-03 | -2.611E-04 |
| a16 | 0.000E+00 | 0.000E+00 | 0.000E+00 | 0.000E+00 | 0.000E+00 | 0.000E+00 |
| a18 | 0.000E+00 | 0.000E+00 | 0.000E+00 | 0.000E+00 | 0.000E+00 | 0.000E+00 |

FIG. 33

| Eighth Example | | | | | | |
|---|---|---|---|---|---|---|
| F= 1.444mm, HFOV= 62.176 deg., Fno= 2.62 | | | | | | |
| No. | | Curvature Radius | Ape. Stop Distance Lens Thickness Air Gap | Refractive Index | Abbe No. | Focal Length | Material |
| | Object | Infinity | Infinity | | | | |
| 11 | First Lens | -80.000 | 0.500 T1 | 1.729 | 54.680 | -4.234 | glass |
| 12 | | 3.220 | 1.887 G12 | | | | |
| 21 | Second Lens | 8.843 | 0.661 T2 | 1.585 | 29.909 | 107.817 | plastic |
| 22 | | 10.000 | 2.287 G23 | | | | |
| 31 | Third Lens | 2.531 | 1.140 T3 | 1.545 | 55.930 | 4.047 | plastic |
| 32 | | -14.441 | 0.452 G34 | | | | |
| 80 | Ape. Stop | Infinity | 0.381 | | | | |
| 41 | Fourth Lens | 4.587 | 0.351 T4 | 1.643 | 22.437 | -4.989 | plastic |
| 42 | | 1.831 | 0.060 G45 | | | | |
| 51 | Fifth Lens | 3.241 | 1.252 T5 | 1.545 | 55.930 | 1.391 | plastic |
| 52 | | -0.855 | 0.052 G56 | | | | |
| 61 | Sixth Lens | 1.383 | 0.291 T6 | 1.643 | 22.437 | -2.187 | plastic |
| 62 | | 0.640 | 0.547 | | | | |
| 60 | IR Filter | Infinity | 0.210 | | | | |
| | | Infinity | 0.733 | | | | |
| | | Infinity | 0.000 | | | | |
| 71 | Image Plane | Infinity | | | | | |

FIG. 34

| No. | 11 | 12 | 21 | 22 | 31 | 32 |
|---|---|---|---|---|---|---|
| K | 0.000E+00 | 0.000E+00 | -1.359E+00 | -3.113E+01 | -8.417E-01 | 1.873E+02 |
| a4 | 0.000E+00 | 0.000E+00 | 3.131E-03 | -4.738E-03 | -1.509E-02 | -2.611E-02 |
| a6 | 0.000E+00 | 0.000E+00 | -3.555E-04 | 6.437E-05 | 1.890E-03 | 4.782E-02 |
| a8 | 0.000E+00 | 0.000E+00 | 2.714E-05 | 4.578E-06 | -1.175E-03 | -4.802E-02 |
| a10 | 0.000E+00 | 0.000E+00 | 0.000E+00 | 0.000E+00 | 3.976E-04 | 2.748E-02 |
| a12 | 0.000E+00 | 0.000E+00 | 0.000E+00 | 0.000E+00 | 0.000E+00 | 0.000E+00 |
| a14 | 0.000E+00 | 0.000E+00 | 0.000E+00 | 0.000E+00 | 0.000E+00 | 0.000E+00 |
| a16 | 0.000E+00 | 0.000E+00 | 0.000E+00 | 0.000E+00 | 0.000E+00 | 0.000E+00 |
| a18 | 0.000E+00 | 0.000E+00 | 0.000E+00 | 0.000E+00 | 0.000E+00 | 0.000E+00 |
| No. | 41 | 42 | 51 | 52 | 61 | 62 |
| K | 3.662E+01 | -1.705E+01 | 6.021E+00 | -2.835E+00 | -1.407E+01 | -4.148E+00 |
| a4 | -3.752E-01 | -7.159E-02 | -1.819E-02 | 1.313E-02 | -1.696E-01 | -1.735E-01 |
| a6 | 5.280E-02 | -2.189E-01 | -1.803E-02 | -1.084E-01 | -5.450E-02 | 7.748E-02 |
| a8 | -9.701E-02 | 2.623E-01 | 9.635E-02 | 1.309E-01 | 4.401E-02 | -2.660E-02 |
| a10 | -3.569E-01 | -1.052E-01 | -4.694E-02 | -1.303E-03 | -2.045E-02 | 4.720E-03 |
| a12 | 0.000E+00 | 0.000E+00 | -5.525E-03 | -2.379E-02 | 1.136E-02 | 7.641E-04 |
| a14 | 0.000E+00 | 0.000E+00 | 0.000E+00 | 1.070E-02 | -1.095E-02 | -4.015E-04 |
| a16 | 0.000E+00 | 0.000E+00 | 0.000E+00 | 0.000E+00 | 0.000E+00 | 0.000E+00 |
| a18 | 0.000E+00 | 0.000E+00 | 0.000E+00 | 0.000E+00 | 0.000E+00 | 0.000E+00 |

FIG. 35

|         | Example 1 | Example 2 | Example 3 | Example 4 | Example 5 | Example 6 | Example 7 | Example 8 |
|---------|-----------|-----------|-----------|-----------|-----------|-----------|-----------|-----------|
| Ltt     | 12.306    | 12.805    | 10.630    | 11.787    | 11.256    | 10.803    | 10.800    | 10.804    |
| Tall    | 7.536     | 5.918     | 3.670     | 7.515     | 6.672     | 4.130     | 4.125     | 4.195     |
| Gaa     | 2.940     | 5.288     | 5.460     | 2.523     | 2.873     | 5.173     | 5.222     | 5.120     |
| Ltt/Gaa | 4.185     | 2.422     | 1.947     | 4.672     | 3.918     | 2.088     | 2.068     | 2.110     |
| Ltt/Tall| 1.633     | 2.164     | 2.896     | 1.568     | 1.687     | 2.616     | 2.618     | 2.576     |
| Ltt/T1  | 17.580    | 21.342    | 21.259    | 16.839    | 16.080    | 21.605    | 21.600    | 21.609    |
| Ltt/T2  | 5.764     | 8.526     | 20.492    | 5.879     | 8.368     | 18.793    | 16.415    | 16.341    |
| Ltt/G23 | 18.645    | 5.586     | 4.608     | 17.859    | 16.553    | 4.823     | 4.754     | 4.724     |
| Ltt/T3  | 5.798     | 6.848     | 11.746    | 5.191     | 5.136     | 8.310     | 9.679     | 9.480     |
| Ltt/G34 | 19.392    | 14.103    | 12.014    | 34.497    | 28.107    | 13.571    | 14.272    | 12.966    |
| Ltt/T5  | 6.345     | 10.177    | 9.167     | 6.179     | 6.234     | 9.238     | 8.703     | 8.629     |
| Tall/T2 | 3.530     | 3.941     | 7.075     | 3.748     | 4.960     | 7.185     | 6.270     | 6.345     |
| Tall/G23| 11.418    | 2.582     | 1.591     | 11.387    | 9.812     | 1.844     | 1.816     | 1.834     |
| Tall/G34| 11.875    | 6.518     | 4.148     | 21.994    | 16.660    | 5.188     | 5.451     | 5.034     |
| Tall/T5 | 3.886     | 4.703     | 3.165     | 3.940     | 3.695     | 3.532     | 3.324     | 3.350     |
| Gaa/G23 | 4.455     | 2.307     | 2.367     | 3.822     | 4.225     | 2.309     | 2.298     | 2.238     |
| Gaa/T4  | 8.674     | 13.625    | 18.251    | 7.591     | 8.720     | 17.353    | 16.303    | 14.596    |

FIG. 36

OPTICAL IMAGING LENS AND ELECTRONIC DEVICE COMPRISING THE SAME

CROSS REFERENCE TO RELATED APPLICATION

This application claims priority to Taiwan Application No. 102139575, filed on Oct. 31, 2013.

BACKGROUND OF THE INVENTION

1. Field of the Invention

The present invention generally relates to an optical imaging lens set and an electronic device which includes such optical imaging lens set. Specifically speaking, the present invention is directed to an optical imaging lens set of reduced length and an electronic device which includes such optical imaging lens set.

2. Description of the Prior Art

In recent years, the popularity of mobile phones and digital cameras makes the sizes of various portable electronic products reduce quickly so does the photography modules. The current trend of research is to develop an optical imaging lens set of a shorter length with uncompromised good quality. The most important characters of an optical imaging lens set are image quality and size.

U.S. Pat. No. 7,580,205 discloses a wide-angle optical imaging lens set made of six lens elements. To pursue better image quality, more lens elements are used so the total length of the optical imaging lens set is up to 20 mm or more. Such bulky optical imaging lens set is not suitable for an electronic device of small size.

It is still a problem, on one hand, to reduce the system length efficiently and, on the other hand, to maintain a sufficient optical performance in this field.

SUMMARY OF THE INVENTION

In the light of the above, the present invention is capable of proposing an optical imaging lens set of lightweight, low production cost, reduced length, high resolution and high image quality. The optical imaging lens set of six lens elements of the present invention has a first lens element, a second lens element, a third lens element, a fourth lens element, a fifth lens element and a sixth lens element sequentially from an object side to an image side along an optical axis. The first lens element has negative refractive power. The second lens element has a second object-side surface with a convex portion in a vicinity of its circular periphery. The third lens element has a third object-side surface with a convex portion in a vicinity of its circular periphery. The fourth lens element has refractive power. The fifth lens element has a fifth image-side surface with a convex portion in a vicinity of the optical axis. The sixth lens element has a sixth object-side surface with a concave portion in a vicinity of its circular periphery. The optical imaging lens set exclusively has six lens elements with refractive power.

In the optical imaging lens set of six lens elements of the present invention, a distance $L_{tt}$ from the first object-side surface to an imaging plane on the image side along the optical axis and an air gap $G_{23}$ between the second lens element and the third lens element along the optical axis satisfy a relationship $L_{tt}/G_{23} \leq 20.0$.

In the optical imaging lens set of six lens elements of the present invention, a thickness $T_5$ of the fifth lens element along the optical axis satisfies a relationship $L_{tt}/T_5 \leq 11.0$.

In the optical imaging lens set of six lens elements of the present invention, an air gap $G_{23}$ between the second lens element and the third lens element along the optical axis satisfy a relationship $T_{all}/G_{23} \leq 10.0$.

In the optical imaging lens set of six lens elements of the present invention, a distance $L_{tt}$ from the first object-side surface to an imaging plane on the image side along the optical axis satisfies a relationship $L_{tt}/T_{all} \leq 3.0$.

In the optical imaging lens set of six lens elements of the present invention, a thickness $T_5$ of the fifth lens element along the optical axis satisfies a relationship $T_{all}/T_5 \leq 5.0$.

In the optical imaging lens set of six lens elements of the present invention, the sum of all five air gaps $G_{aa}$ between each lens element from the first lens element to the sixth lens element along the optical axis and an air gap $G_{23}$ between the second lens element and the third lens element along the optical axis satisfy a relationship $G_{aa}/G_{23} \leq 4.5$.

In the optical imaging lens set of six lens elements of the present invention, a thickness $T_1$ of the first lens element along the optical axis satisfies a relationship $L_{tt}/T_1 \leq 23.0$.

In the optical imaging lens set of six lens elements of the present invention, an air gap $G_{34}$ between the third lens element and the fourth lens element along the optical axis satisfies a relationship $T_{all}/G_{34} \leq 23.0$.

In the optical imaging lens set of six lens elements of the present invention, a thickness $T_2$ of the second lens element along the optical axis satisfies a relationship $T_{all}/T_2 \leq 7.5$.

In the optical imaging lens set of six lens elements of the present invention, a thickness $T_1$ of the first lens element along the optical axis satisfies a relationship $L_{tt}/T_1 \leq 23.0$.

In the optical imaging lens set of six lens elements of the present invention, air gap $G_{34}$ between the third lens element and the fourth lens element along the optical axis satisfies a relationship $L_{tt}/G_{34} \leq 35.0$.

In the optical imaging lens set of six lens elements of the present invention, a thickness $T_2$ of the second lens element along the optical axis satisfies a relationship $L_{tt}/T_2 \leq 17.0$.

In the optical imaging lens set of six lens elements of the present invention, a thickness $T_3$ of the third lens element along the optical axis satisfies a relationship $L_{tt}/T_3 \leq 8.5$.

In the optical imaging lens set of six lens elements of the present invention, a distance $L_{tt}$ from the first object-side surface to an imaging plane on the image side along the optical axis satisfies a relationship $L_{tt}/G_{aa} \leq 5.0$.

In the optical imaging lens set of six lens elements of the present invention, a thickness $T_4$ of the fourth lens element along the optical axis satisfies a relationship $8.5 \leq G_{aa}/T_4$.

In the optical imaging lens set of six lens elements of the present invention, a thickness $T_5$ of the fifth lens element along the optical axis satisfies a relationship $L_{tt}/T_5 \leq 11.0$.

The present invention also proposes an electronic device which includes the optical imaging lens set as described above. The electronic device includes a case and an image module disposed in the case. The image module includes an optical imaging lens set as described above, a barrel for the installation of the optical imaging lens set, a module housing unit for the installation of the barrel, a substrate for the installation of the module housing unit and an image sensor disposed at the substrate and at an image side of the optical imaging lens set.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 20 shows the optical data of the first example of the optical imaging lens set.

FIG. 21 shows the aspheric surface data of the first example.

FIG. 22 shows the optical data of the second example of the optical imaging lens set.

FIG. 23 shows the aspheric surface data of the second example.

FIG. 24 shows the optical data of the third example of the optical imaging lens set.

FIG. 25 shows the aspheric surface data of the third example.

FIG. 26 shows the optical data of the fourth example of the optical imaging lens set.

FIG. 27 shows the aspheric surface data of the fourth example.

FIG. 28 shows the optical data of the fifth example of the optical imaging lens set.

FIG. 29 shows the aspheric surface data of the fifth example.

FIG. 30 shows the optical data of the sixth example of the optical imaging lens set.

FIG. 31 shows the aspheric surface data of the sixth example.

FIG. 32 shows the optical data of the seventh example of the optical imaging lens set.

FIG. 33 shows the aspheric surface data of the seventh example.

FIG. 34 shows the optical data of the eighth example of the optical imaging lens set.

FIG. 35 shows the aspheric surface data of the eighth example.

FIG. 36 shows some important ratios in the examples.

DETAILED DESCRIPTION

Figure 17:
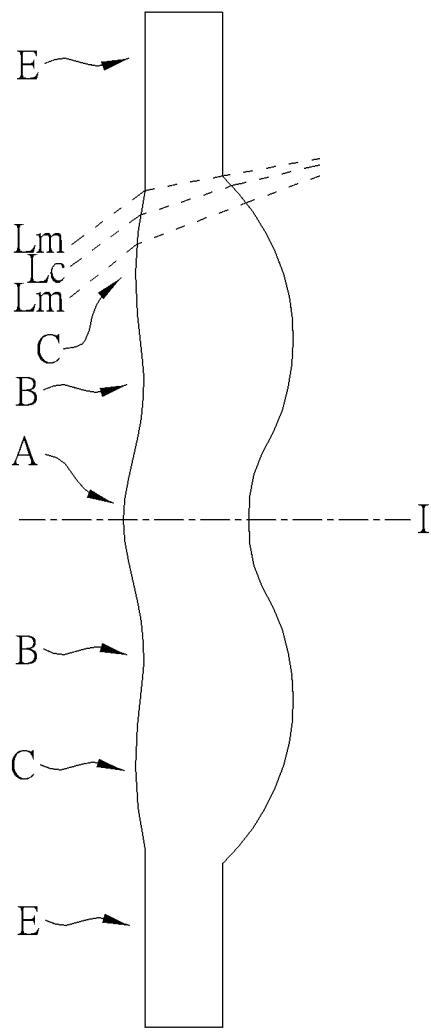
FIG. 17 illustrates exemplificative shapes of the optical imaging lens element of the present invention.

Before the detailed description of the present invention, the first thing to be noticed is that in the present invention, similar (not necessarily identical) elements share the same numeral references. In the entire present specification, "a certain lens element has negative/positive refractive power" refers to the part in a vicinity of the optical axis of the lens element has negative/positive refractive power. "An object-side/image-side surface of a certain lens element has a concave/convex part or concave/convex portion" refers to the part is more concave/convex in a direction parallel with the optical axis to be compared with an outer region next to the region. Take FIG. 17 for example, the optical axis is "I" and the lens element is symmetrical with respect to the optical axis I. The object side of the lens element has a convex part in the region A, a concave part in the region B, and a convex part in the region C because region A is more convex in a direction parallel with the optical axis than an outer region (region B) next to region A, region B is more concave than region C and region C is similarly more convex than region E. "A circular periphery of a certain lens element" refers to a circular periphery region of a surface on the lens element for light to pass through, that is, region C in the drawing. In the drawing, imaging light includes Lc (chief ray) and Lm (marginal ray). "A vicinity of the optical axis" refers to an optical axis region of a surface on the lens element for light to pass through, that is, the region A in FIG. 17. In addition, the lens element may include an extension part E for the lens element to be installed in an optical imaging lens set. Ideally speaking, no light would pass through the extension part, and the actual structure and shape of the extension part is not limited to this and may have other variations. For the reason of simplicity, the extension part is not illustrated in the examples.

Figure 1:
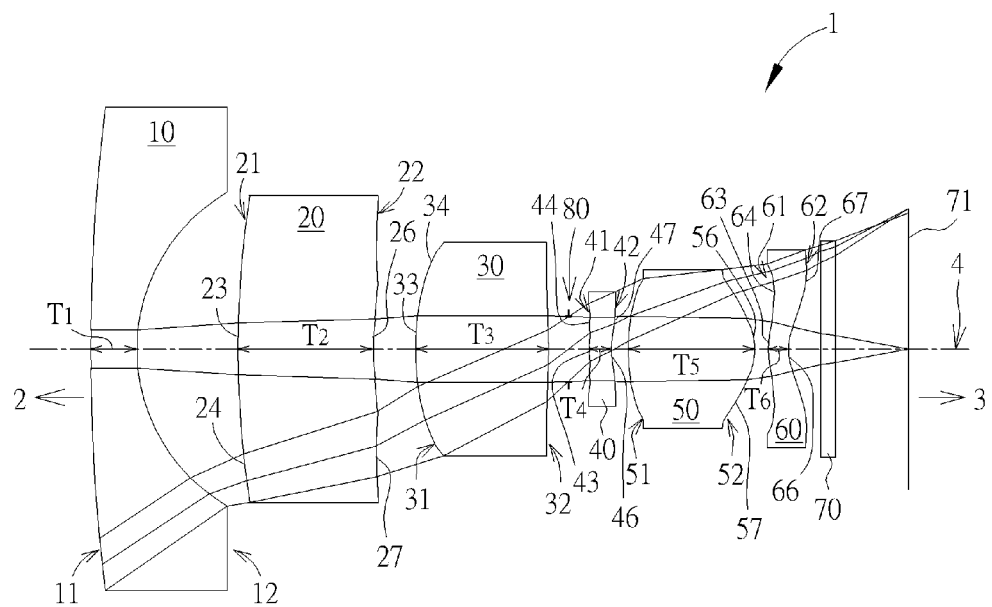
FIG. 1 illustrates a first example of the optical imaging lens set of the present invention.

As shown in FIG. 1, the optical imaging lens set 1 of the present invention, sequentially from an object side 2 (where an object is located) to an image side 3 along an optical axis 4, has a first lens element 10, a second lens element 20, a third lens element 30, a fourth lens element 40, a fifth lens element 50, a sixth lens element 60, a filter 70 and an image plane 71. Generally speaking, the first lens element 10 is made of a transparent glass material, but the second lens element 20, the third lens element 30, the fourth lens element 40, the fifth lens element 50 and the sixth lens element 60 may be made of a transparent plastic material, but the present invention is not limited to this. There are exclusively six lens elements with refractive power in the optical imaging lens set 1 of the present invention. The optical axis 4 is the optical axis of the entire optical imaging lens set 1, and the optical axis of each of the lens elements coincides with the optical axis of the optical imaging lens set 1.

Furthermore, the optical imaging lens set 1 includes an aperture stop (ape. stop) 80 disposed in an appropriate position. In FIG. 1, the aperture stop 80 is disposed between the third lens element 30 and the fourth lens element 40. When light emitted or reflected by an object (not shown) which is located at the object side 2 enters the optical imaging lens set 1 of the present invention, it forms a clear and sharp image on the image plane 71 at the image side 3 after passing through the first lens element 10, the second lens element 20, the third lens element 30, the aperture stop 80, the fourth lens element 40, the fifth lens element 50, and the sixth lens element 60 and the filter 70.

In the embodiments of the present invention, the optional filter 70 may be a filter of various suitable functions, for example, the filter 70 may be an infrared cut filter (IR cut filter), placed between the sixth lens element 60 and the image plane 71.

Each lens element in the optical imaging lens set 1 of the present invention has an object-side surface facing toward the object side 2 as well as an image-side surface facing toward the image side 3. In addition, each object-side surface and image-side surface in the optical imaging lens set 1 of the present invention has a part in a vicinity of its circular periphery (circular periphery part) away from the optical axis 4 as well as a part in a vicinity of the optical axis (optical axis part) closer to the optical axis 4. For example, the first lens element 10 has an object-side surface 11 and an image-side surface 12; the second lens element 20 has an object-side surface 21 and an image-side surface 22; the third lens element 30 has an object-side surface 31 and an image-side surface 32; the fourth lens element 40 has an object-side surface 41 and an image-side surface 42; the fifth lens element 50 has an object-side surface 51 and an image-side surface 52; the sixth lens element 60 has an object-side surface 61 and an image-side surface 62.

Each lens element in the optical imaging lens set 1 of the present invention further has a central thickness T on the optical axis 4. For example, the first lens element 10 has a first lens element thickness $T_1$, the second lens element 20 has a second lens element thickness $T_2$, the third lens element 30 has a third lens element thickness $T_3$, the fourth lens element 40 has a fourth lens element thickness $T_4$, the fifth lens element 50 has a fifth lens element thickness $T_5$ and the sixth lens element 60 has a sixth lens element thickness $T_6$. Therefore, the total thickness of all the lens elements in the optical imaging lens set 1 along the optical axis 4 is $T_{all}=T_1+T_2+T_3+T_4+T_5+T_6$.

In addition, between two adjacent lens elements in the optical imaging lens set 1 of the present invention there is an air gap G along the optical axis 4. For example, an air gap $G_{12}$ is disposed between the first lens element 10 and the second lens element 20, an air gap $G_{23}$ is disposed between the second lens element 20 and the third lens element 30, an air gap $G_{34}$ is disposed between the third lens element 30 and the fourth lens element 40, an air gap $G_{45}$ is disposed between the fourth lens element 40 and the fifth lens element 50 and an air gap $G_{56}$ is disposed between the fifth lens element 50 and the sixth lens element 60. Therefore, the sum of total five air gaps between adjacent lens elements from the first lens element 10 to the sixth lens element 60 along the optical axis 4 is $G_{aa}=G_{12}+G_{23}+G_{34}+G_{45}+G_{56}$. Also, a distance from the first object-side 11 of the first lens element 10 facing toward the object side 2 to an imaging plane 71 on the image side 3 along the optical axis 4 is $L_{tt}$.

First Example

Figures 2A, 2B, 2C, 2D:
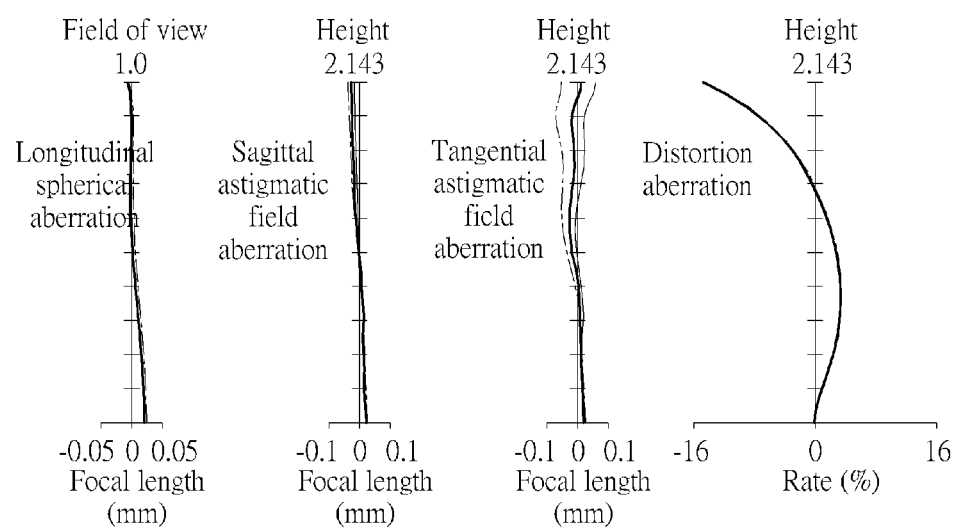
FIG. 2A illustrates the longitudinal spherical aberration on the image plane of the first example.
FIG. 2B illustrates the astigmatic aberration on the sagittal direction of the first example.
FIG. 2C illustrates the astigmatic aberration on the tangential direction of the first example.
FIG. 2D illustrates the distortion aberration of the first example.

Please refer to FIG. 1 which illustrates the first example of the optical imaging lens set 1 of the present invention. Please refer to FIG. 2A for the longitudinal spherical aberration on the image plane 71 of the first example; please refer to FIG. 2B for the astigmatic field aberration on the sagittal direction; please refer to FIG. 2C for the astigmatic field aberration on the tangential direction, and please refer to FIG. 2D for the distortion aberration. The Y axis of the spherical aberration in each example is "field of view" for 1.0. The Y axis of the astigmatic field and the distortion in each example stands for "image height".

The optical imaging lens set 1 of the first example has the first lens element 10 made of a transparent glass material with refractive power and five lens elements such as the second lens element 20, the third lens element 30, the fourth lens element 40, the fifth lens element 50 and the sixth lens element 60 made of a transparent plastic material, a filter 70, an aperture stop 80, and an image plane 71. The aperture stop 80 is provided between the third lens element 30 and the fourth lens element 40. The filter 70 may be an infrared filter (IR cut filter) to prevent inevitable infrared in light reaching the image plane to adversely affect the imaging quality.

The first lens element 10 has negative refractive power. The object-side surface 11 of the first lens element 10 facing toward the object side 2 is a convex surface and the image-side surface 12 of the first lens element 10 facing toward the image side 3 is a concave surface. Both the object-side surface 11 and the image-side 12 of the first lens element 10 may be spherical surfaces.

The second lens element 20 has positive refractive power. The object-side surface 21 of the second lens element 20 facing toward the object side 2 has a convex part 23 (convex optical axis part) in the vicinity of the optical axis and a convex part 24 (convex circular periphery part) in a vicinity of its circular periphery. The image-side surface 22 of the second lens element 20 facing toward the image side 3 has a concave part 26 (concave optical axis part) in the vicinity of the optical axis and a concave part 27 (concave circular periphery part) in a vicinity of its circular periphery. In addition, both the object-side surface 21 and the image-side surface 22 of the second lens element 20 are aspherical surfaces.

The third lens element 30 has positive refractive power, an object-side surface 31 of the third lens element 30 facing toward the object side 2 and an image-side surface 32 of the third lens element 30 facing toward the image side 3. The object-side surface 31 has a convex part 33 (convex optical axis part) in the vicinity of the optical axis and a convex part 34 (convex circular periphery part) in a vicinity of its circular periphery. The image-side surface 32 is a convex surface. In addition, both the object-side surface 31 and the mage-side surface 32 of the third lens element 30 are aspherical surfaces.

The fourth lens element 40 has negative refractive power. The object-side surface 41 of the fourth lens element 40 facing toward the object side 2 has a convex part 43 (convex optical axis part) in the vicinity of the optical axis and a concave part 44 (concave circular periphery part) in a vicinity of its circular periphery. The image-side surface 42 of the fourth lens element 40 facing toward the image side 3 has a concave part 46 (concave optical axis part) in the vicinity of the optical axis and a convex part 47 (convex circular periphery part) in a vicinity of its circular periphery. In addition, both the object-side surface 41 and the image-side 42 of the fourth lens element 40 are aspherical surfaces.

The fifth lens element 50 has positive refractive power, an object-side surface 51 of the fifth lens element 50 facing toward the object side 2 and an image-side surface 52 of the fifth lens element 50 facing toward the image side 3. The image-side surface 52 has a convex part 56 (convex optical axis part) in the vicinity of the optical axis and a convex part 57 (convex circular periphery part) in a vicinity of its circular periphery. Further, both the object-side surface 51 and the image-side 52 of the fifth lens element 50 are aspherical surfaces.

The sixth lens element 60 has negative refractive power. The object-side surface 61 of the sixth lens element 60 facing toward the object side 2 has a convex part 63 (convex optical axis part) in the vicinity of the optical axis and a concave part 64 (concave circular periphery part) in a vicinity of its circular periphery. The image-side surface 62 of the sixth lens element 60 facing toward the image side 3 has a concave part 66 (concave optical axis part) in the vicinity of the optical axis and a convex part 67 (convex circular periphery part) in a vicinity of its circular periphery. In addition, both the object-side surface 61 and the image-side surface 62 of the sixth lens element 60 are aspherical surfaces. The filter 70 may be an infrared cut filter, and is disposed between the sixth lens element 60 and the image plane 71.

In the optical imaging lens element 1 of the present invention, the object side 21/31/41/51/61 and image side 22/32/42/52/62 from the second lens element 20 to the sixth lens element 60, total of ten surfaces are all aspherical. These aspheric coefficients are defined according to the following formula:

$$Z(Y) = \frac{Y^2}{R} \left/ \left( 1 + \sqrt{1 - (1+K)\frac{Y^2}{R^2}} \right) \right. + \sum_{i=1}^{n} a_{2i} \times Y^{2i}$$

In which:
R represents the curvature radius of the lens element surface;
Z represents the depth of an aspherical surface (the perpendicular distance between the point of the aspherical surface at a distance Y from the optical axis and the tangent plane of the vertex on the optical axis of the aspherical surface);
Y represents a vertical distance from a point on the aspherical surface to the optical axis;
K is a conic constant;
$a_{2i}$ is the aspheric coefficient of the 2i order.

The optical data of the first example of the optical imaging lens set 1 are shown in FIG. 20 while the aspheric surface data are shown in FIG. 21. In the following examples of the optical imaging lens set, the f-number of the entire optical lens element system is Fno, HFOV stands for the half field of view which is half of the field of view of the entire optical lens element system, and the unit for the curvature radius, the thickness, and the focal length is in millimeters (mm), and F is a system focal length $E_{fl}$ of the optical imaging lens set 1. The length of the optical imaging lens set is 12.306 mm (from the first object-side surface to the image plane along the optical axis). The image height is 2.143 mm. Some important ratios of the first example are as follows:

$L_{tt}/G_{aa}$=4.185
$L_{tt}/T_{all}$=1.633
$L_{tt}/T_1$=17.580
$L_{tt}/T_2$=5.764
$L_{tt}/G_{23}$=18.645
$L_{tt}/T_3$=5.798
$L_{tt}/G_{34}$=19.392
$L_{tt}/T_5$=6.345
$T_{all}/T_2$=3.530
$T_{all}/G_{23}$=11.418
$T_{all}/G_{34}$=11.875
$T_{all}/T_5$=3.886
$G_{aa}/G_{23}$=4.455
$G_{aa}/T_4$=8.674

Second Example

Figure 3:
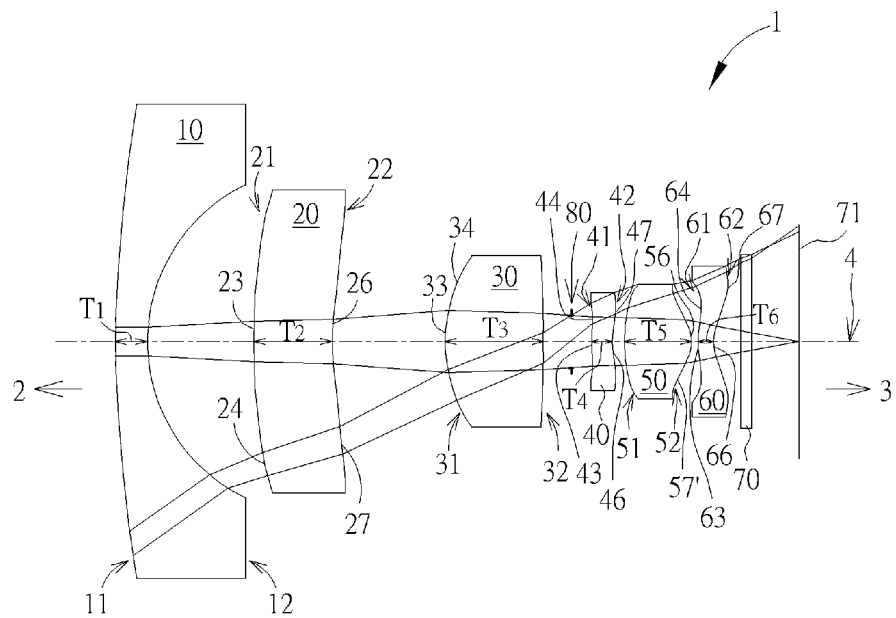
FIG. 3 illustrates a second example of the optical imaging lens set of four lens elements of the present invention.
Figures 4A, 4B, 4C, 4D:
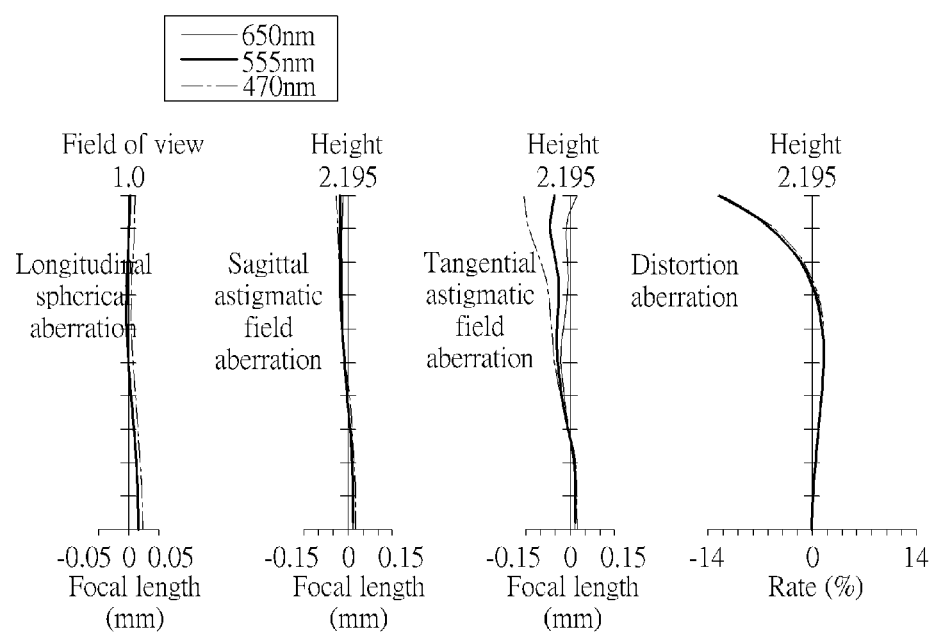
FIG. 4A illustrates the longitudinal spherical aberration on the image plane of the second example.
FIG. 4B illustrates the astigmatic aberration on the sagittal direction of the second example.
FIG. 4C illustrates the astigmatic aberration on the tangential direction of the second example.
FIG. 4D illustrates the distortion aberration of the second example.

Please refer to FIG. 3 which illustrates the second example of the optical imaging lens set 1 of the present invention. Please refer to FIG. 4A for the longitudinal spherical aberration on the image plane 71 of the second example; please refer to FIG. 4B for the astigmatic aberration on the sagittal direction; please refer to FIG. 4C for the astigmatic aberration on the tangential direction, and please refer to FIG. 4D for the distortion aberration. The second example is similar with the first example except that the second lens element 20 has negative refractive power, and the image-side surface 52 has a concave part 57' (concave circular periphery part) in a vicinity of its circular periphery. The optical data of the third example of the optical imaging lens set are shown in FIG. 22 while the aspheric surface data are shown in FIG. 23. The length of the optical imaging lens set is 12.805 mm. The image height is 2.195 mm. Some important ratios of the second example are as follows:

$L_{tt}/G_{aa}$=2.422
$L_{tt}/T_{all}$=2.164
$L_{tt}/T_1$=21.342

Figure 5:
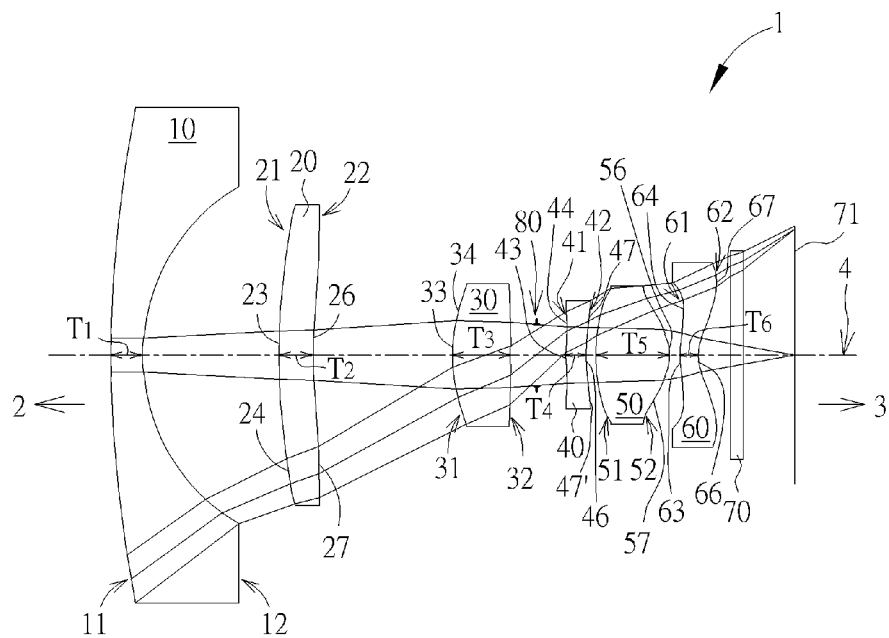
FIG. 5 illustrates a third example of the optical imaging lens set of four lens elements of the present invention.
Figures 6A, 6B, 6C, 6D:
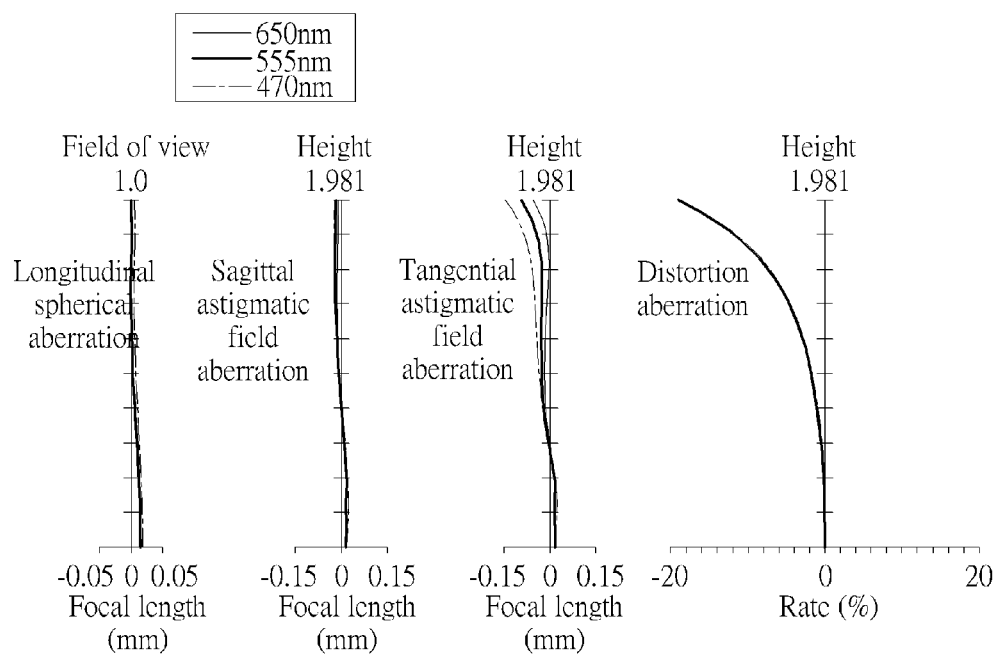
FIG. 6A illustrates the longitudinal spherical aberration on the image plane of the third example.
FIG. 6B illustrates the astigmatic aberration on the sagittal direction of the third example.
FIG. 6C illustrates the astigmatic aberration on the tangential direction of the third example.
FIG. 6D illustrates the distortion aberration of the third example.
Figure 7:
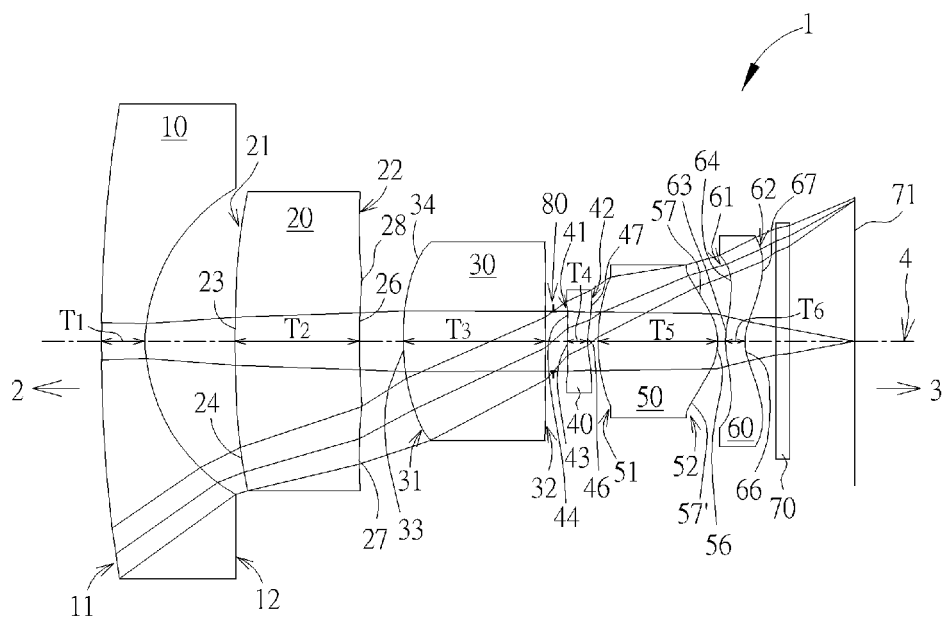
FIG. 7 illustrates a fourth example of the optical imaging lens set of four lens elements of the present invention.
Figures 8A, 8B, 8C, 8D:
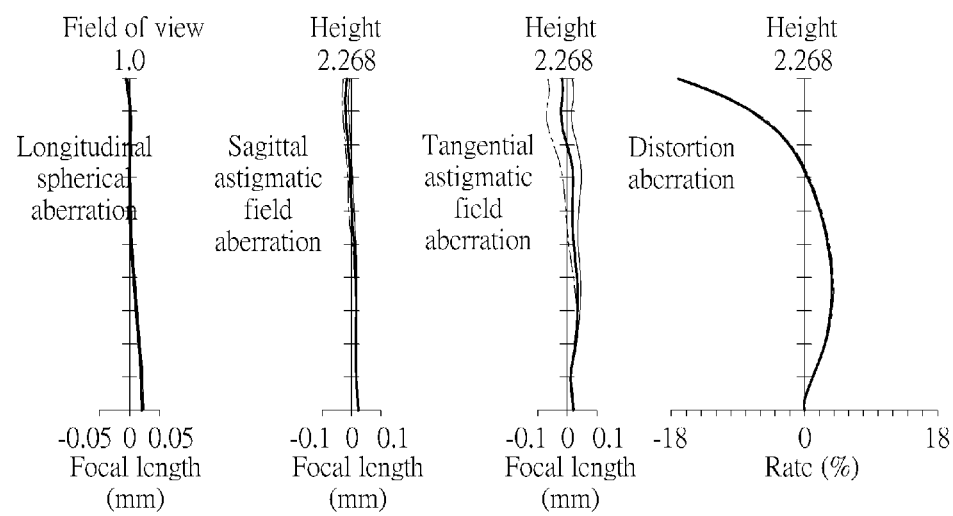
FIG. 8A illustrates the longitudinal spherical aberration on the image plane of the fourth example.
FIG. 8B illustrates the astigmatic aberration on the sagittal direction of the fourth example.
FIG. 8C illustrates the astigmatic aberration on the tangential direction of the fourth example.
FIG. 8D illustrates the distortion aberration of the fourth example.
Figure 9:
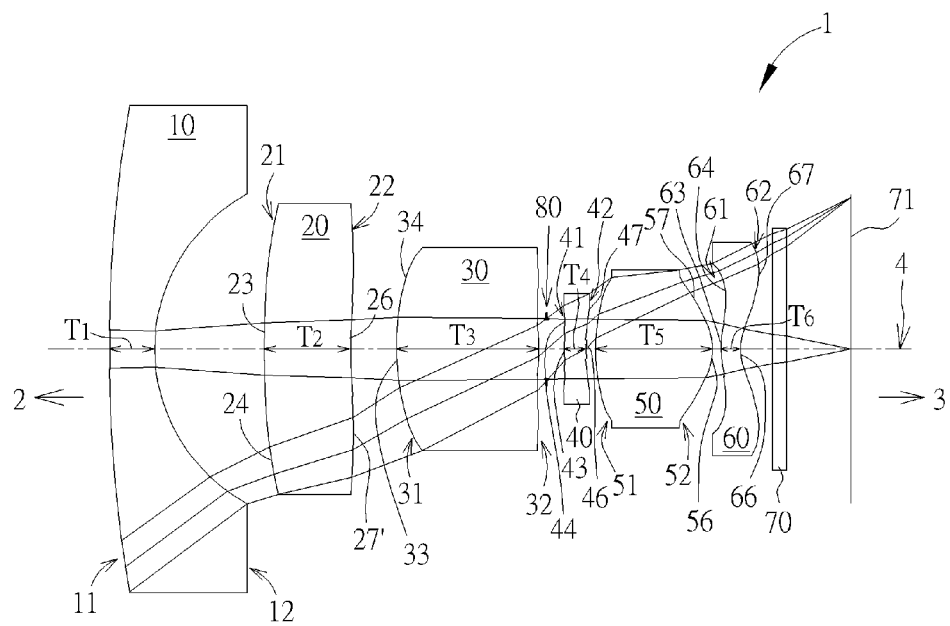
FIG. 9 illustrates a fifth example of the optical imaging lens set of four lens elements of the present invention.
Figure 10A:
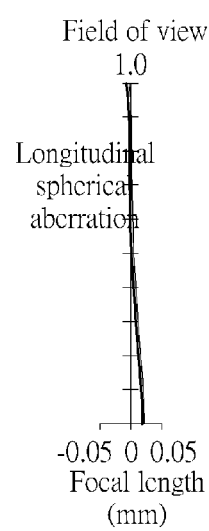
FIG. 10A illustrates the longitudinal spherical aberration on the image plane of the fifth example.
Figure 10B:
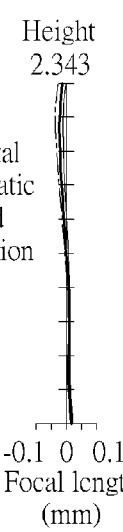
FIG. 10B illustrates the astigmatic aberration on the sagittal direction of the fifth example.
Figure 10C:
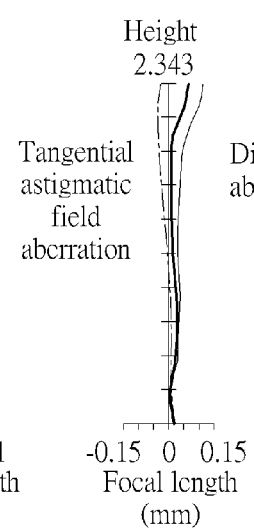
FIG. 10C illustrates the astigmatic aberration on the tangential direction of the fifth example.
Figure 10D:
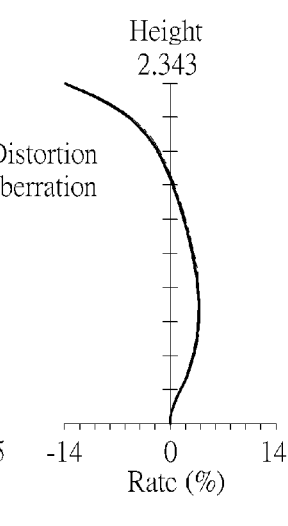
FIG. 10D illustrates the distortion aberration of the fifth example.
Figure 11:
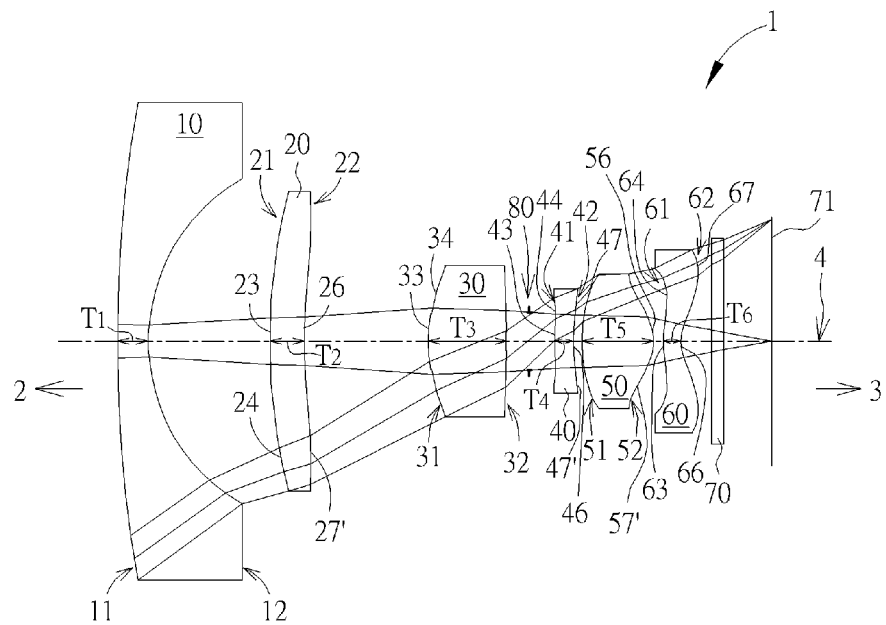
FIG. 11 illustrates a sixth example of the optical imaging lens set of four lens elements of the present invention.
Figures 12A, 12B, 12C, 12D:
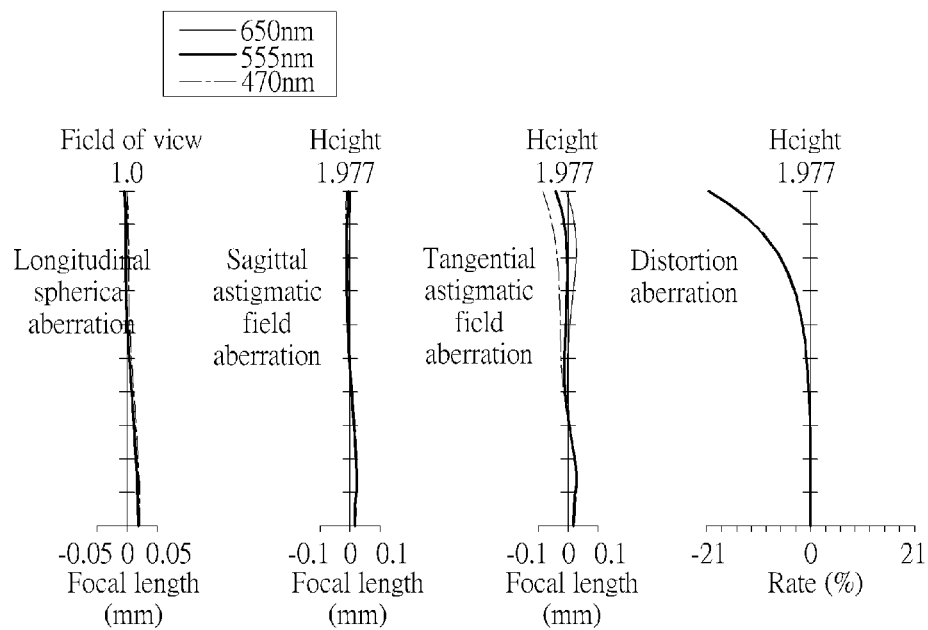
FIG. 12A illustrates the longitudinal spherical aberration on the image plane of the sixth example.
FIG. 12B illustrates the astigmatic aberration on the sagittal direction of the sixth example.
FIG. 12C illustrates the astigmatic aberration on the tangential direction of the sixth example.
FIG. 12D illustrates the distortion aberration of the sixth example.
Figure 13:
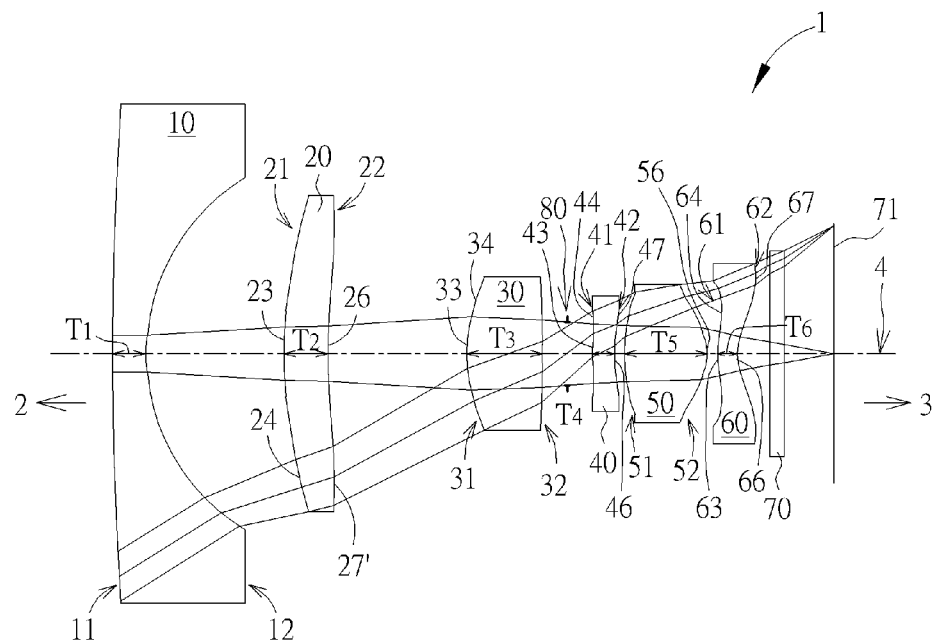
FIG. 13 illustrates a seventh example of the optical imaging lens set of four lens elements of the present invention.
Figures 14A, 14B, 14C, 14D:
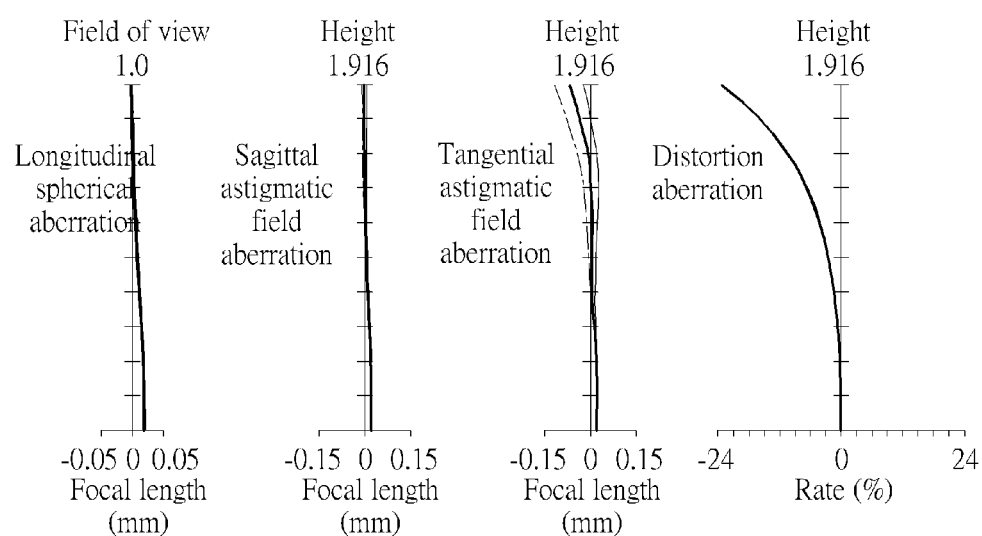
FIG. 14A illustrates the longitudinal spherical aberration on the image plane of the seventh example.
FIG. 14B illustrates the astigmatic aberration on the sagittal direction of the seventh example.
FIG. 14C illustrates the astigmatic aberration on the tangential direction of the seventh example.
FIG. 14D illustrates the distortion aberration of the seventh example.
Figure 15:
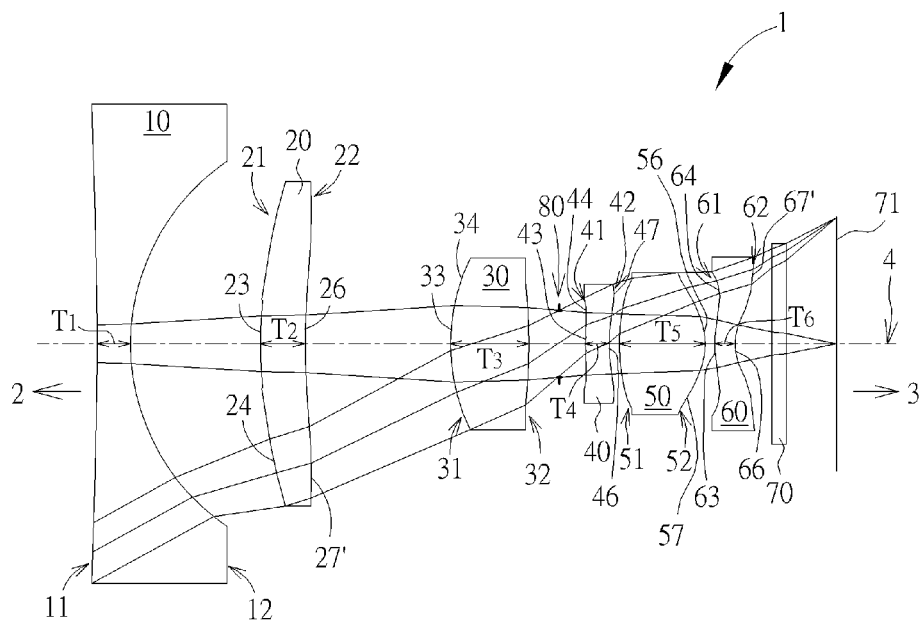
FIG. 15 illustrates a eighth example of the optical imaging lens set of four lens elements of the present invention.
Figures 16A, 16B, 16C, 16D:
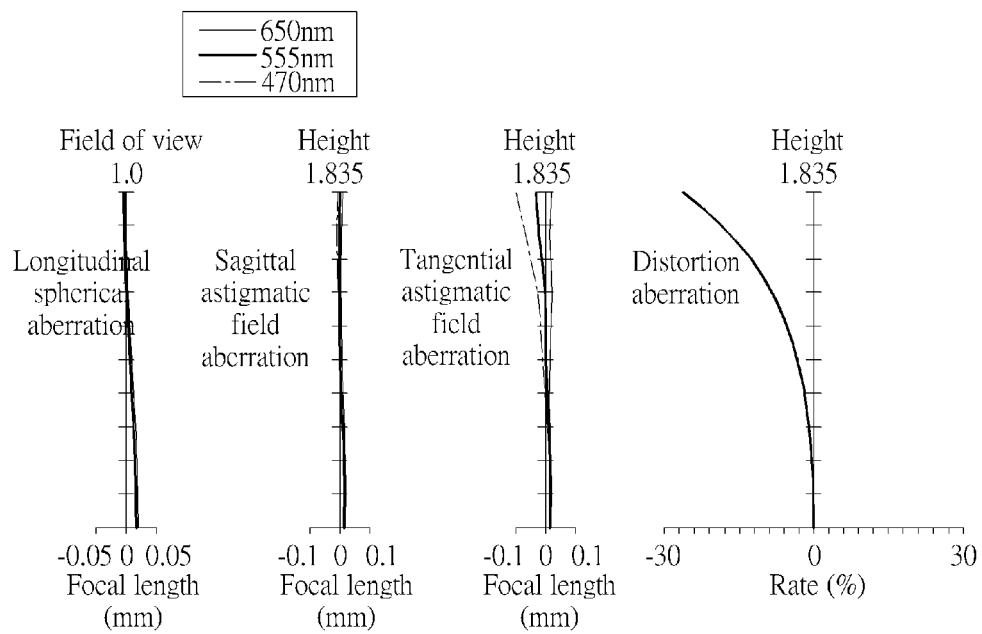
FIG. 16A illustrates the longitudinal spherical aberration on the image plane of the eighth example.
FIG. 16B illustrates the astigmatic aberration on the sagittal direction of the seventh example.
FIG. 16C illustrates the astigmatic aberration on the tangential direction of the eighth example.
FIG. 16D illustrates the distortion aberration of the eighth example.

$L_{tt}/T_2=8.526$
$L_{tt}/G_{23}=5.586$
$L_{tt}/T_3=6.848$
$L_{tt}/G_{34}=14.103$
$L_{tt}/T_5=10.177$
$T_{all}/T_2=3.941$
$T_{all}/G_{23}=2.582$
$T_{all}/G_{34}=6.518$
$T_{all}/T_5=4.703$
$G_{aa}/G_{23}=2.307$
$G_{aa}/T_4=13.625$ Third Example Please refer to FIG. 5 which illustrates the third example of the optical imaging lens set 1 of the present invention. Please refer to FIG. 6A for the longitudinal spherical aberration on the image plane 71 of the second example; please refer to FIG. 6B for the astigmatic aberration on the sagittal direction; please refer to FIG. 6C for the astigmatic aberration on the tangential direction, and please refer to FIG. 6D for the distortion aberration. The third example is similar with the first example except that the second lens element 20 has negative refractive power, and the image-side surface 42 of the fourth lens element 40 has a concave part 47' (concave circular periphery part) in a vicinity of its circular periphery. The optical data of the third example of the optical imaging lens set are shown in FIG. 24 while the aspheric surface data are shown in FIG. 25. The length of the optical imaging lens set is 10.63 mm. The image height is 1.981 mm. Some important ratios of the third example are as follows:

$L_{tt}/G_{aa}=1.947$
$L_{tt}/T_{all}=2.896$
$L_{tt}/T_1=21.259$
$L_{tt}/T_2=20.492$
$L_{tt}/G_{23}=4.608$
$L_{tt}/T_3=11.746$
$L_{tt}/G_{34}=12.014$
$L_{tt}/T_5=9.167$
$T_{all}/T_2=7.075$
$T_{all}/G_{23}=1.591$
$T_{all}/G_{34}=4.148$
$T_{all}/T_5=3.165$
$G_{aa}/G_{23}=2.367$
$G_{aa}/T_4=18.251$ Fourth Example Please refer to FIG. 7 which illustrates the fourth example of the optical imaging lens set 1 of the present invention. Please refer to FIG. 8A for the longitudinal spherical aberration on the image plane 71 of the second example; please refer to FIG. 8B for the astigmatic aberration on the sagittal direction; please refer to FIG. 8C for the astigmatic aberration on the tangential direction, and please refer to FIG. 8D for the distortion aberration. The fourth example is similar with the first example except that the image-side surface 22 of the second lens element 20 facing toward the image side 3 has a concave part 26 (concave optical axis part) in the vicinity of the optical axis, a concave part 27 (concave circular periphery part) in a vicinity of its circular periphery and a convex part 28 between the concave optical axis part and the concave circular periphery part, and the image-side surface 52 of the fifth lens element 50 has a concave part 57' (concave circular periphery part). The optical data of the fourth example of the optical imaging lens set are shown in FIG. 26 while the aspheric surface data are shown in FIG. 27. The length of the optical imaging lens set is 11.787 mm. The image height is 2.268 mm. Some important ratios of the fourth example are as follows:

$L_{tt}/G_{aa}=4.672$
$L_{tt}/T_{all}=1.568$
$L_{tt}/T_1=16.839$
$L_{tt}/T_2=5.879$
$L_{tt}/G_{23}=17.859$
$L_{tt}/T_3=5.191$
$L_{tt}/G_{34}=34.497$
$L_{tt}/T_5=6.179$
$T_{all}/T_2=3.748$
$T_{all}/G_{23}=11.387$
$T_{all}/G_{34}=21.994$
$T_{all}/T_5=3.940$
$G_{aa}/G_{23}=3.822$
$G_{aa}/T_4=7.591$ Fifth Example Please refer to FIG. 9 which illustrates the fifth example of the optical imaging lens set 1 of the present invention. Please refer to FIG. 10A for the longitudinal spherical aberration on the image plane 71 of the second example; please refer to FIG. 10B for the astigmatic aberration on the sagittal direction; please refer to FIG. 10C for the astigmatic aberration on the tangential direction, and please refer to FIG. 10D for the distortion aberration. The fifth example is similar with the first example except that the image-side surface 22 of the second lens element 20 facing toward the image side 3 has a convex part 27' (convex circular periphery part) in a vicinity of its circular periphery. The optical data of the fifth example of the optical imaging lens set are shown in FIG. 28 while the aspheric surface data are shown in FIG. 29. The length of the optical imaging lens set is 11.256 mm. The image height is 2.343 mm. Some important ratios of the fifth example are as follows:

$L_{tt}/G_{aa}=3.918$
$L_{tt}/T_{all}=1.687$
$L_{tt}/T_1=16.080$
$L_{tt}/T_2=8.368$
$L_{tt}/G_{23}=16.553$
$L_{tt}/T_3=5.136$
$L_{tt}/G_{34}=28.107$
$L_{tt}/T_5=6.234$
$T_{all}/T_2=4.960$
$T_{all}/G_{23}=9.812$
$T_{all}/G_{34}=16.660$
$T_{all}/T_5=3.695$
$G_{aa}/G_{23}=4.225$
$G_{aa}/T_4=8.720$ Sixth Example Please refer to FIG. 11 which illustrates the sixth example of the optical imaging lens set 1 of the present invention. Please refer to FIG. 12A for the longitudinal spherical aberration on the image plane 71 of the second example; please refer to FIG. 12B for the astigmatic aberration on the sagittal direction; please refer to FIG. 12C for the astigmatic aberration on the tangential direction, and please refer to FIG. 12D for the distortion aberration. The sixth example is similar with the first example except that the second lens element 20 has negative refractive power, a convex part 27' (convex circular periphery part) in a vicinity of its circular periphery, the image-side surface 42 of the fourth lens element 40 has a concave part 47' (concave circular periphery part) in a vicinity of its circular periphery and the image-side surface 52 of the fifth lens element 50 has a concave part 57' (concave circular periphery part) in a vicinity of its circular periphery. The optical data of the sixth example of the optical imaging lens set are shown in FIG. 30 while the aspheric surface data are shown in FIG. 31. The length of the optical imaging lens set is 10.803 mm. The image height is 1.977 mm. Some important ratios of the sixth example are as follows:

$L_{tt}/G_{aa}=2.088$
$L_{tt}/T_{all}=2.616$
$L_{tt}/T_1=21.605$
$L_{tt}/T_2=18.793$
$L_{tt}/G_{23}=4.823$
$L_{tt}/T_3=8.310$
$L_{tt}/G_{34}=13.571$
$L_{tt}/T_5=9.238$
$T_{all}/T_2=7.185$
$T_{all}/G_{23}=1.844$
$T_{all}/G_{34}=5.188$
$T_{all}/T_5=3.532$
$G_{ad}/G_{23}=2.309$
$G_{ad}/T_4=17.353$ Seventh Example Please refer to FIG. 13 which illustrates the seventh example of the optical imaging lens set 1 of the present invention. Please refer to FIG. 14A for the longitudinal spherical aberration on the image plane 71 of the second example; please refer to FIG. 14B for the astigmatic aberration on the sagittal direction; please refer to FIG. 14C for the astigmatic aberration on the tangential direction, and please refer to FIG. 14D for the distortion aberration. The seventh example is similar with the first example except that the second lens element 20 has a convex part 27' (convex circular periphery part) in a vicinity of its circular periphery. The optical data of the seventh example of the optical imaging lens set are shown in FIG. 32 while the aspheric surface data are shown in FIG. 33. The length of the optical imaging lens set is 10.8 mm. The image height is 1.916 mm. Some important ratios of the sixth example are as follows:

$L_{tt}/G_{aa}=2.068$
$L_{tt}/T_{all}=2.618$
$L_{tt}/T_1=21.600$
$L_{tt}/T_2=16.415$
$L_{tt}/G_{23}=4.754$
$L_{tt}/T_3=9.679$
$L_{tt}/G_{34}=14.272$
$L_{tt}/T_5=8.703$
$T_{all}/T_2=6.270$
$T_{all}/G_{23}=1.816$
$T_{all}/G_{34}=5.451$
$T_{all}/T_5=3.324$
$G_{ad}/G_{23}=2.298$
$G_{ad}/T_4=16.303$ Eighth Example Please refer to FIG. 15 which illustrates the eighth example of the optical imaging lens set 1 of the present invention. Please refer to FIG. 16A for the longitudinal spherical aberration on the image plane 71 of the eighth example; please refer to FIG. 16B for the astigmatic aberration on the sagittal direction; please refer to FIG. 16C for the astigmatic aberration on the tangential direction, and please refer to FIG. 16D for the distortion aberration. The eighth example is similar with the first example except that the object-side surface 11 of the first lens element 10 is a concave surface, the image-side surface 22 of the second lens element 20 has a convex part 27' (convex circular periphery part) in a vicinity of its circular periphery, and the image-side surface 62 of the sixth lens element 60 has a concave part 67' (concave circular periphery part) in a vicinity of its circular periphery. The optical data of the eighth example of the optical imaging lens set are shown in FIG. 34 while the aspheric surface data are shown in FIG. 35. The length of the optical imaging lens set is 10.804 mm. The image height is 1.835 mm. Some important ratios of the fifth example are as follows:

$L_{tt}/G_{aa}=2.110$
$L_{tt}/T_{all}=2.576$
$L_{tt}/T_1=21.609$
$L_{tt}/T_2=16.341$
$L_{tt}/G_{23}=4.724$
$L_{tt}/T_3=9.480$
$L_{tt}/G_{34}=12.966$
$L_{tt}/T_5=8.629$
$T_{all}/T_2=6.345$
$T_{all}/G_{23}=1.834$
$T_{all}/G_{34}=5.034$
$T_{all}/T_5=3.350$
$G_{ad}/G_{23}=2.238$
$G_{ad}/T_4=14.596$ Some important ratios in each example are shown in FIG. 36.

In the light of the above examples, the inventors observe the following features:
1) In each one of the above examples, the longitudinal spherical aberration, the astigmatic aberration and the distortion aberration are respectively less than ±0.04 mm, ±0.2 mm and ±30%. By observing the longitudinal spherical aberration of each example, it is suggested that all curves of every wavelength are close to one another, which reveals off-axis light of different heights of every wavelength all concentrates on the image plane, and deviations of every curve also reveal that off-axis light of different heights are well controlled so the examples do improve the spherical aberration, the astigmatic aberration and the distortion aberration. 2) In addition, the distances amongst the three representing different wavelengths are pretty close to one another, which means the present invention is able to concentrate light of the three representing different wavelengths so that the aberration is greatly improved.
3) The system total length of the examples is smaller than 13.0 mm. The demonstrated first example may maintain a good optical performance and reduced lens set length to realize a smaller product design and excellent image quality.

In addition, it is found that there are some better ratio ranges for different optical data according to the above various important ratios. Better ratio ranges help the designers to design the better optical performance and an effectively reduced length of a practically possible optical imaging lens set. For example:

1. $L_{tt}/G_{23} \leq 20.0$. When $L_{tt}/G_{23} \leq 20.0$, the reduction ratio of the gap $G_{23}$ with respect to the total length $L_{tt}$ is smaller so the second lens element 20 and the third lens element 30 may keep a better air gap $G_{23}$ to enhance a good image quality. Preferably, it is suggested that $4.0 \leq L_{tt}/G_{23} \leq 20.0$.
2. $L_{tt}/T_5 \leq 11.0$. If $L_{tt}/T_5 \leq 11.0$, it means that the reduction ratio of $T_5$ with respect to the total length $L_{tt}$ is less. However, considering optical properties and fabrication capability, this relationship satisfies a better arrangement. Preferably, it is suggested that $6.0 \leq L_{tt}/T_5 \leq 11.0$.
3. $T_{all}/G_{23} \leq 10.0$. When $T_{all}/G_{23} \leq 10.0$, the reduction ratio of the gap $G_{23}$ with respect to the total length $T_{all}$ is smaller so the second lens element 20 and the third lens element 30 may keep a better air gap $G_{23}$ to enhance a good image quality. Preferably, it is suggested that $1.0 \leq T_{all}/G_{23} \leq 10.0$.

4. $L_{tt}/T_{all} \leq 3.0$. When $L_{tt}/T_{all} \leq 3.0$, it means that the reduction ratio of $T_{all}$ with respect to the total length $L_{tt}$ is smaller. However, considering optical properties and fabrication capability, this relationship satisfies a better arrangement. It is suggested that $1.0 \leq L_{tt}/T_{all} \leq 3.0$.

5. $T_{all}/T_5 \leq 5.0$. When $T_{all}/T_5 \leq 5.0$, it means that the reduction ratio of $T_5$ with respect to the total gap $T_{all}$ is smaller. However, considering optical properties and fabrication capability, this relationship satisfies a better arrangement. It is suggested that $3.0 \leq T_{all}/T_5 \leq 5.0$.

6. $G_{aa}/G_{23} \leq 4.5$. When $G_{aa}/G_{23} \leq 4.5$, it means that the reduction ratio of $G_{23}$ with respect to $G_{aa}$ is smaller so the second lens element 20 and the third lens element 30 may keep a better air gap $G_{23}$ to enhance a good image quality. Preferably, it is suggested that $2.0 \leq G_{aa}/G_{23} \leq 4.5$.

7. $L_{tt}/T_1 \leq 23.0$. Because the first lens element 10 provides refractive power, a thicker $T_1$ is much harder to become thinner. When $L_{tt}/T_1 \leq 23.0$, it means that $L_{tt}$ is reduced more to have smaller total length and better optical quality. Preferably, it is suggested that $15.0 \leq L_{tt}/T_1 \leq 23.0$.

8. $T_{all}/G_{34} \leq 23.0$. When $T_{all}/G_{34} \leq 23.0$, the reduction ratio of the gap $G_{34}$ with respect to the total length $T_{all}$ is smaller so the third lens element 30 and the fourth lens element 40 may keep a better air gap $G_{34}$ to enhance a good image quality. Preferably, it is suggested that $4.0 \leq T_{all}/G_{34} \leq 23.0$.

9. $T_{all}/T_2 7.5$. When $T_{all}/T_2 \leq 7.5$, it means that the reduction ratio of $T_2$ with respect to the total length $T_{all}$ is smaller. However, considering optical properties and fabrication capability, this relationship satisfies a better arrangement. Preferably, it is suggested that $3.0 \leq T_{all}/T_2 \leq 7.5$.

10. $L_{tt}/G_{34} \leq 35.0$. When $L_{tt}/G_{34} \leq 35.0$, it means that the reduction ratio of $G_{34}$ with respect to the total length $L_{tt}$ is smaller so the third lens element 30 and the fourth lens element 40 may keep a better air gap $G_{34}$ to enhance the image quality. Preferably, it is suggested that $11.0 \leq L_{tt}/G_{34} \leq 35.0$.

11. $L_{tt}/T_2 \leq 17.0$. When $L_{tt}/T_2 \leq 17.0$, it means that the reduction ratio of $T_2$ with respect to the total length $L_{tt}$ is smaller. However, considering optical properties and fabrication capability, this relationship satisfies a better arrangement. Preferably, it is suggested that $5.0 \leq T_{tt}/T_2 \leq 17.0$.

12. $L_{tt}/T_3 \leq 8.5$. When $L_{tt}/T_3 \leq 8.5$, it means that the reduction ratio of $T_3$ with respect to the total length $L_{tt}$ is smaller. However, considering optical properties and fabrication capability, this relationship satisfies a better arrangement. Preferably, it is suggested that $5.0 \leq L_{tt}/T_3 \leq 8.5$.

13. $L_{tt}/G_{aa} \leq 5.0$. When $L_{tt}/G_{aa} \leq 5.0$, it means that the reduction ratio of $G_{aa}$ with respect to the total length $L_{tt}$ is smaller. However, considering optical properties and fabrication capability, this relationship satisfies a better arrangement. Preferably, it is suggested that $1.5 \leq L_{tt}/G_{aa} \leq 50$.

14. $8.5 \leq G_{aa}/T_4$. When $8.5 \leq G_{aa}/T_4$, it means that the reduction ratio of $T_4$ with respect to $G_{aa}$ is larger. However, considering optical properties and fabrication capability, this relationship satisfies a better arrangement. It is suggested that $8.5 \leq G_{aa}/T_4 \leq 20.0$.

Figure 18:
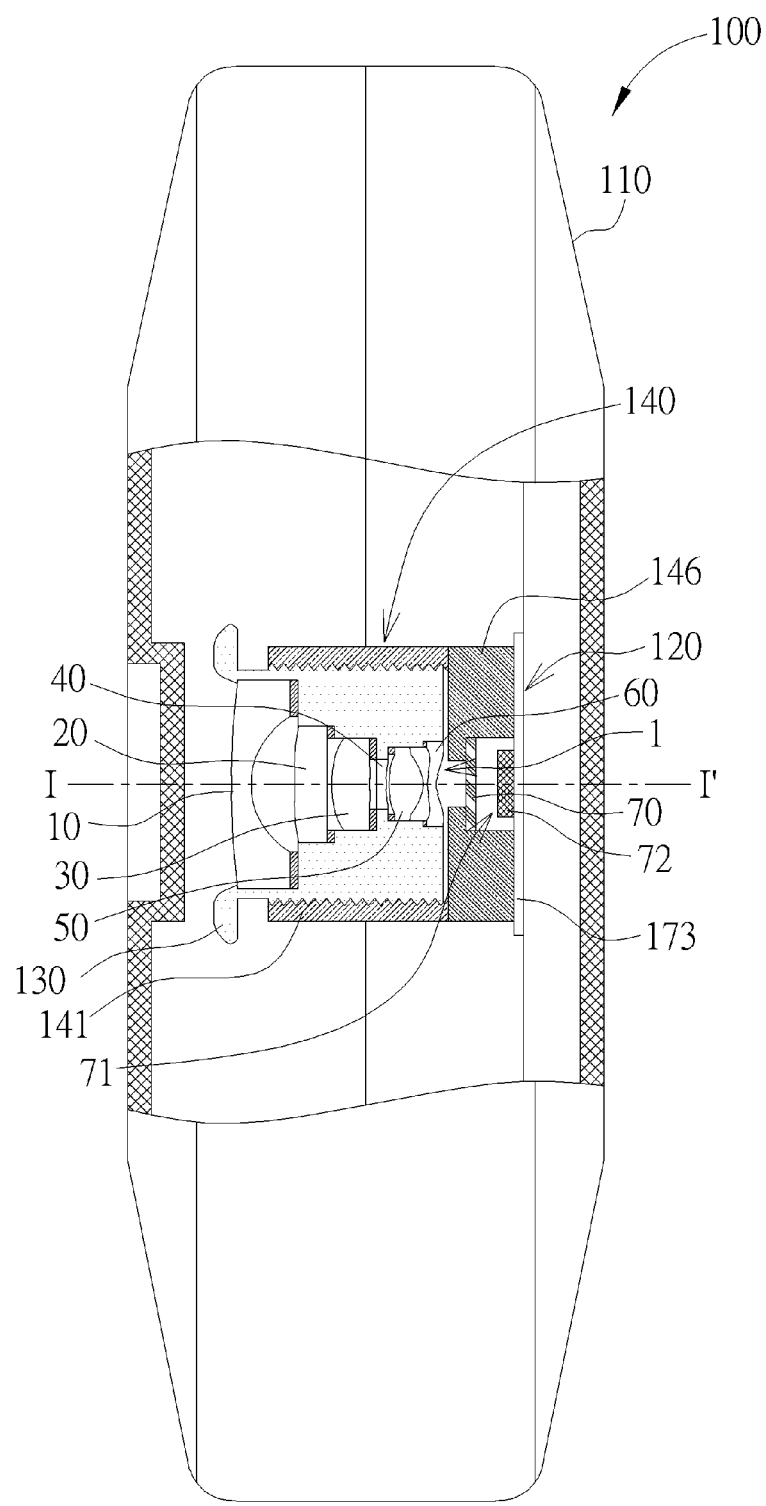
FIG. 18 illustrates a first preferred example of the portable electronic device with an optical imaging lens set of the present invention.

The optical imaging lens set 1 of the present invention may be applied to a portable electronic device. Please refer to FIG. 18. FIG. 18 illustrates a first preferred example of the optical imaging lens set 1 of the present invention for use in a portable electronic device 100. The portable electronic device 100 includes a case 110, and an image module 120 mounted in the case 110. A mobile phone is illustrated in FIG. 18 as an example, but the portable electronic device 100 is not limited to a mobile phone.

As shown in FIG. 18, the image module 120 includes the optical imaging lens set 1 as described above. FIG. 18 illustrates the aforementioned first example of the optical imaging lens set 1. In addition, the portable electronic device 100 also contains a barrel 130 for the installation of the optical imaging lens set 1, a module housing unit 140 for the installation of the barrel 130, a substrate 172 for the installation of the module housing unit 140 and an image sensor 70 disposed at the substrate 172, and at the image side 3 of the optical imaging lens set 1. The image sensor 70 in the optical imaging lens set 1 may be an electronic photosensitive element, such as a charge coupled device or a complementary metal oxide semiconductor element. The image plane 71 forms at the image sensor 70.

The image sensor 70 used here is a product of chip on board (COB) package rather than a product of the conventional chip scale package (CSP) so it is directly attached to the substrate 172, and protective glass is not needed in front of the image sensor 70 in the optical imaging lens set 1, but the present invention is not limited to this.

To be noticed in particular, the optional filter 70 may be omitted in other examples although the optional filter 70 is present in this example. The case 110, the barrel 130, and/or the module housing unit 140 may be a single element or consist of a plurality of elements, but the present invention is not limited to this.

Each one of the six lens elements 10, 20, 30, 40 and 50 with refractive power is installed in the barrel 130 with air gaps disposed between two adjacent lens elements in an exemplary way. The module housing unit 140 has a lens element housing 141, and an image sensor housing 146 installed between the lens element housing 141 and the image sensor 70. However in other examples, the image sensor housing 146 is optional. The barrel 130 is installed coaxially along with the lens element housing 141 along the axis I-I', and the barrel 130 is provided inside of the lens element housing 141.

Because the optical imaging lens set 1 of the present invention may be as short as 13.0 mm, this ideal length allows the dimensions and the size of the portable electronic device 100 to be smaller and lighter, but excellent optical performance and image quality are still possible. In such a way, the various examples of the present invention satisfy the need for economic benefits of using less raw materials in addition to satisfy the trend for a smaller and lighter product design and consumers' demands.

Figure 19:
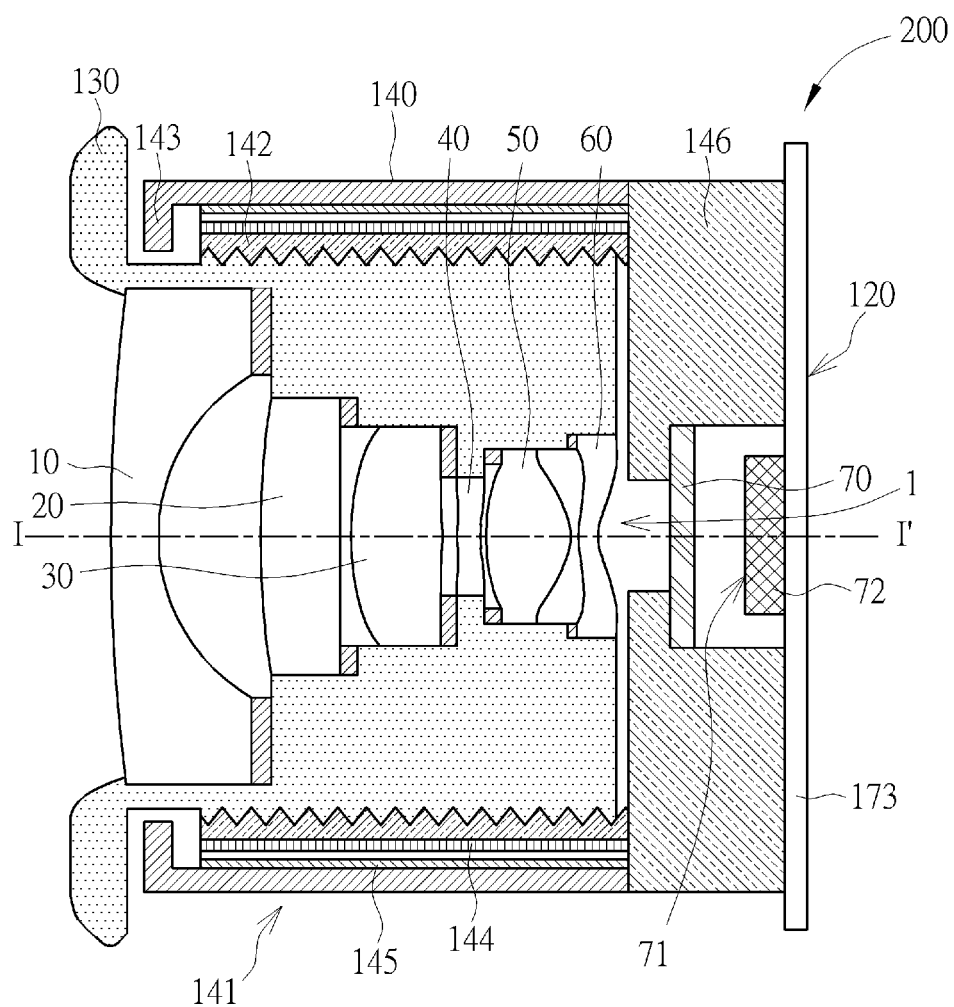
FIG. 19 illustrates a second preferred example of the portable electronic device with an optical imaging lens set of the present invention.

Please also refer to FIG. 19 for another application of the aforementioned optical imaging lens set 1 in a portable electronic device 200 in the second preferred example. The main differences between the portable electronic device 200 in the second preferred example and the portable electronic device 100 in the first preferred example are: the lens element housing 141 has a first seat element 142, a second seat element 143, a coil 144 and a magnetic component 145. The first seat element 142 is for the installation of the barrel 130, exteriorly attached to the barrel 130 and disposed along the axis I-I'. The second seat element 143 is disposed along the axis I-I' and surrounds the exterior of the first seat element 142. The coil 144 is provided between the outside of the first seat element 142 and the inside of the second seat element 143. The magnetic component 145 is disposed between the outside of the coil 144 and the inside of the second seat element 143.

The first seat element 142 may pull the barrel 130 and the optical imaging lens set 1 which is disposed inside of the barrel 130 to move along the axis I-I', namely the optical axis 4 in FIG. 1. The image sensor housing 146 is attached to the second seat element 143. The filter 70, such as an infrared filter, is installed at the image sensor housing 146. Other details of the portable electronic device 200 in the second preferred example are similar to those of the portable electronic device 100 in the first preferred example so they are not elaborated again.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical imaging lens set, comprising: a first lens element, a second lens element, a third lens element, a fourth lens element, a fifth lens element and a sixth lens element from an object side toward an image side in order along an optical axis and each lens element has an object-side surface facing toward said object side and allowing imaging light to pass through as well as an image-side surface facing toward said image side and allowing said imaging light to pass through, wherein:
said first lens element has negative refractive power;
said second lens element has a second object-side surface with a convex portion in a vicinity of a circular periphery of said second lens element;
said third lens element has a third object-side surface with a convex portion in a vicinity of a circular periphery of said third lens element;
said fourth lens element has refractive power;
said fifth lens element has a fifth image-side surface with a convex portion in a vicinity of said optical axis; and
said sixth lens element has a sixth object-side surface with a concave portion in a vicinity of a circular periphery of said sixth lens element, wherein said optical imaging lens set exclusively has six lens elements with refractive power, and a distance $L_{tt}$ from said first object-side surface to an imaging plane on said image side along said optical axis and an air gap $G_{23}$ between said second lens element and said third lens element along said optical axis satisfy a relationship $L_{tt}/G_{23} \leq 20.0$.

2. The optical imaging lens set of claim 1, wherein a total thickness $T_{all}$ of said first lens element, said second lens element, said third lens element, said fourth lens element, said fifth lens element and said sixth lens element along said optical axis satisfies a relationship $T_{all}/G_{23} \leq 10.0$.

3. The optical imaging lens set of claim 2, satisfying a relationship $L_{tt}/T_{all} \leq 3.0$.

4. The optical imaging lens set of claim 3, wherein a thickness $T_5$ of said fifth lens element along said optical axis satisfies a relationship $T_{all}/T_5 \leq 11.0$.

5. The optical imaging lens set of claim 1, wherein the sum of all four air gaps $G_{aa}$ between each lens element from said first lens element to said sixth lens element along the optical axis satisfies a relationship $G_{aa}/G_{23} \leq 4.5$.

6. The optical imaging lens set of claim 5, wherein a thickness $T_1$ of said first lens element along said optical axis satisfies a relationship $L_{tt}/T_1 \leq 23.0$.

7. The optical imaging lens set of claim 1, wherein a total thickness $T_{all}$ of said first lens element, said second lens element, said third lens element, said fourth lens element, said fifth lens element and said sixth lens element along said optical axis and an air gap $G_{34}$ between said third lens element and said fourth lens element along said optical axis satisfy a relationship $T_{all}/G_{34} \leq 23.0$.

8. The optical imaging lens set of claim 7, wherein a thickness $T_2$ of said second lens element along said optical axis satisfies a relationship $T_{all}/T_2 \leq 7.5$.

9. The optical imaging lens set of claim 8, wherein a thickness $T_1$ of said first lens element along said optical axis satisfies a relationship $L_{tt}/T_1 \leq 23.0$.

10. The optical imaging lens set of claim 1, wherein an air gap $G_{34}$ between said third lens element and said fourth lens element along said optical axis satisfies a relationship $L_{tt}/G_{34} \leq 35.0$.

11. The optical imaging lens set of claim 10, wherein a thickness $T_2$ of said second lens element along said optical axis satisfies a relationship $L_{tt}/T_2 \leq 17.0$.

12. The optical imaging lens set of claim 11, wherein a thickness $T_3$ of said third lens element along said optical axis satisfies a relationship $L_{tt}/T_3 \leq 8.5$.

13. The optical imaging lens set of claim 1, wherein the sum of all five air gaps $G_{aa}$ between each lens element from said first lens element to said sixth lens element along the optical axis satisfies a relationship $L_{tt}/G_{aa} \leq 5.0$.

14. The optical imaging lens set of claim 13, wherein a thickness $T_4$ of said fourth lens element along said optical axis satisfies a relationship $8.5 \leq G_{aa}/T_4$.

15. The optical imaging lens set of claim 14, wherein a thickness $T_5$ of said fifth lens element along said optical axis satisfies a relationship $L_{tt}/T_5 \leq 11.0$.

16. An electronic device, comprising:
a case; and
an image module disposed in said case and comprising:
an optical imaging lens set of claim 1;
a barrel for the installation of said optical imaging lens set;
a module housing unit for the installation of said barrel;
a substrate for the installation of said module housing unit; and
an image sensor disposed at an image side of said optical imaging lens set.

17. The optical imaging lens set of claim 1, wherein a thickness $T_5$ of said fifth lens element along said optical axis satisfies a relationship $L_{tt}/T_5 \leq 11.0$.

* * * * *